US012566411B2

(12) United States Patent
Tsuneki et al.

(10) Patent No.: US 12,566,411 B2
(45) Date of Patent: Mar. 3, 2026

(54) CONTROL ASSISTANCE DEVICE, CONTROL SYSTEM, AND FILTER ADJUSTMENT METHOD

(71) Applicant: FANUC CORPORATION, Yamanashi (JP)

(72) Inventors: Ryoutarou Tsuneki, Yamanashi (JP); Masaki Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 449 days.

(21) Appl. No.: 18/041,945

(22) PCT Filed: Sep. 16, 2021

(86) PCT No.: PCT/JP2021/034082
§ 371 (c)(1),
(2) Date: Feb. 16, 2023

(87) PCT Pub. No.: WO2022/065190
PCT Pub. Date: Mar. 31, 2022

(65) Prior Publication Data
US 2024/0027971 A1 Jan. 25, 2024

(30) Foreign Application Priority Data
Sep. 23, 2020 (JP) ................................. 2020-158619

(51) Int. Cl.
*G05B 11/42* (2006.01)
*H02P 23/00* (2016.01)

(52) U.S. Cl.
CPC .......... *G05B 11/42* (2013.01); *H02P 23/0077* (2013.01)

(58) Field of Classification Search
CPC ............................ G05B 11/42; H02P 23/0077
(Continued)

(56) References Cited

U.S. PATENT DOCUMENTS

2007/0019321 A1* 1/2007 Kim ..................... G11B 5/5582
360/78.04
2016/0170400 A1* 6/2016 Iijima ................... G05B 11/011
318/606
(Continued)

FOREIGN PATENT DOCUMENTS

JP H05-35335 A 2/1993
JP 2006-288124 A 10/2006
(Continued)

OTHER PUBLICATIONS

International Search Report issued in PCT/JP2021/034082; mailed Nov. 16, 2021.

*Primary Examiner* — Jigneshkumar C Patel
(74) *Attorney, Agent, or Firm* — Studebaker Brackett PLLC

(57) ABSTRACT

The present invention is to determine allocation of filters in such a manner as to satisfy a restriction for the number of filters while realizing suppression of resonance. The present invention provides a control assistance device assisting in setting a plurality of first filters provided in a servo control device controlling a motor, the control assistance device including: a resonance detection unit for detecting a plurality of resonance points in frequency characteristics including input-output gain and input-output phase lag of the servo control device, the frequency characteristics being measured on the basis of an input signal and an output signal having a varying frequency; a filter setting unit for setting a plurality of second filters the number of which is larger than the number of said plurality of filters in order to suppress the plurality of resonance points; and a grouping unit for grouping the plurality of second filters to set the plurality of first filters.

11 Claims, 11 Drawing Sheets

(58) Field of Classification Search
USPC .......................................................... 700/41
See application file for complete search history.

(56)                    References Cited

U.S. PATENT DOCUMENTS

2017/0010602 A1 *    1/2017   Iijima ..................... H02P 27/08
2020/0301376 A1 *    9/2020   Tsuneki ................ G05B 19/19

FOREIGN PATENT DOCUMENTS

JP          2009-296746  A      12/2009
JP          2020-057211  A       4/2020

* cited by examiner

Figure 9:
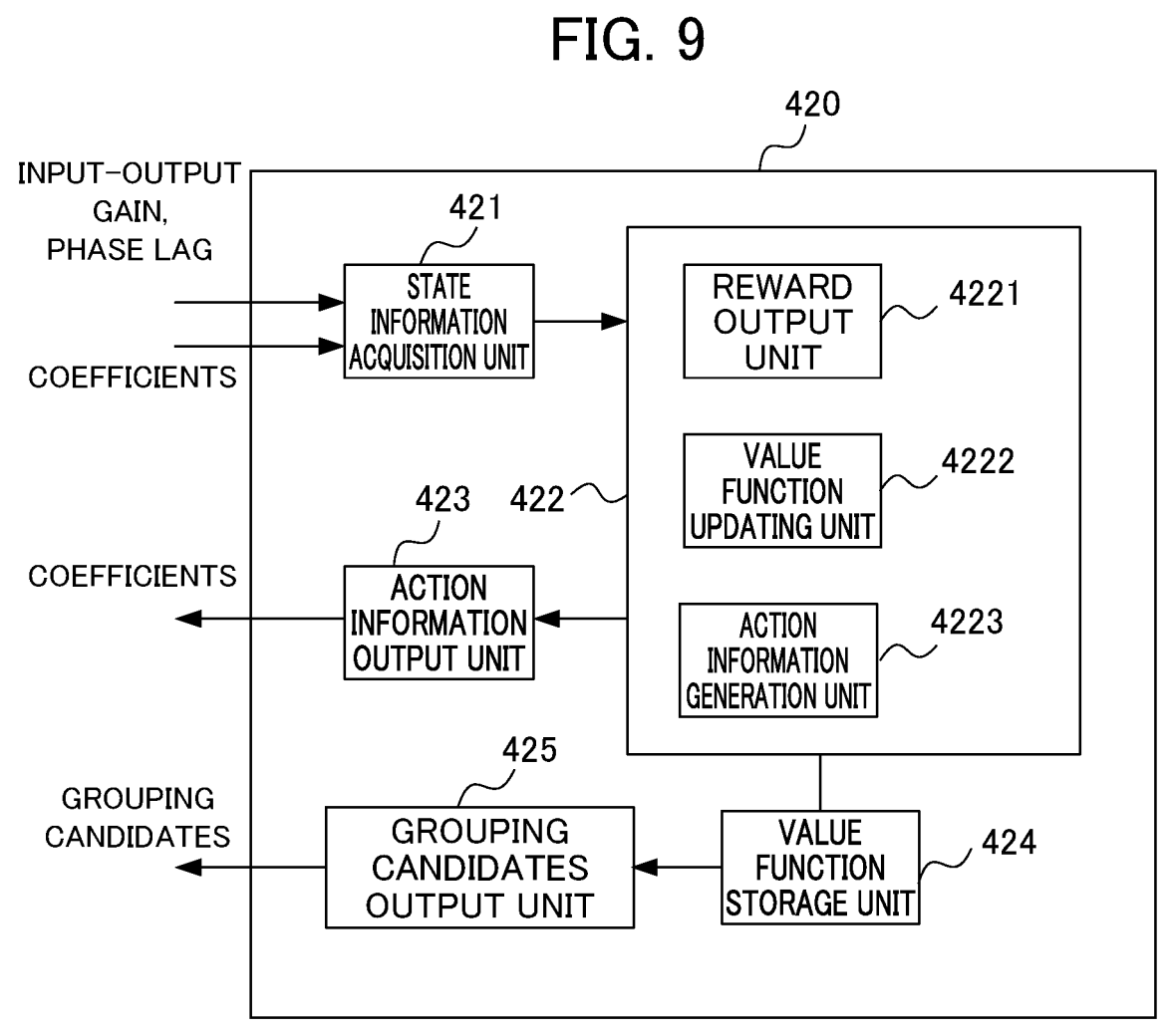

INPUT–OUTPUT
GAIN,
PHASE LAG

421

STATE
INFORMATION
ACQUISITION UNIT

COEFFICIENTS

REWARD
OUTPUT
UNIT          4221

VALUE
FUNCTION
UPDATING UNIT          4222

423          422

COEFFICIENTS

ACTION
INFORMATION
OUTPUT UNIT

ACTION
INFORMATION
GENERATION UNIT          4223

425

GROUPING
CANDIDATES

GROUPING
CANDIDATES
OUTPUT UNIT

VALUE
FUNCTION
STORAGE UNIT          424

FIG. 10

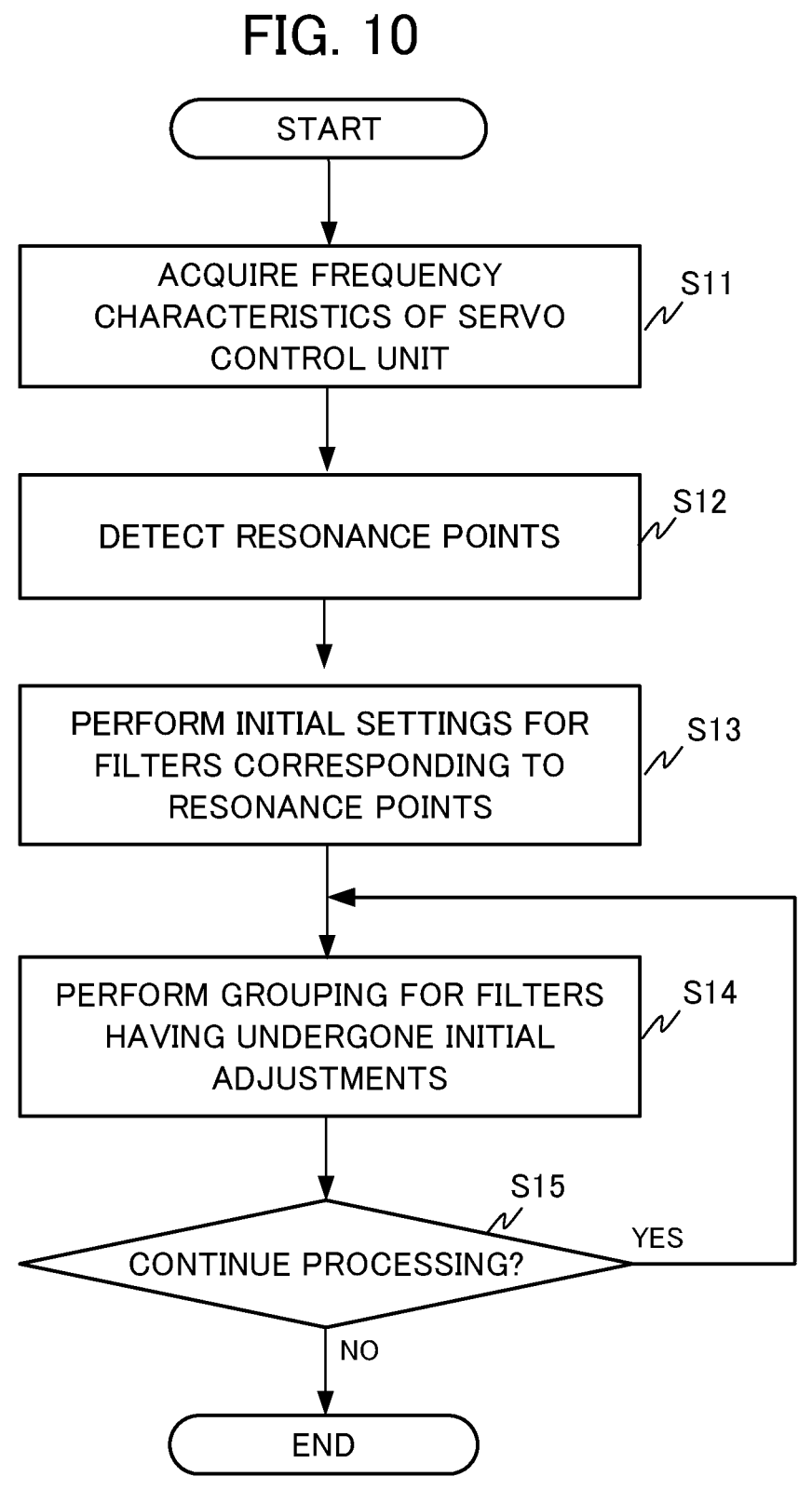

```
            ┌─────────────┐
            │    START    │
            └─────────────┘
                   │
                   ▼
   ┌───────────────────────────────┐
   │     ACQUIRE FREQUENCY         │      S11
   │   CHARACTERISTICS OF SERVO    │
   │        CONTROL UNIT           │
   └───────────────────────────────┘
                   │
                   ▼
   ┌───────────────────────────────┐
   │    DETECT RESONANCE POINTS    │      S12
   └───────────────────────────────┘
                   │
                   ▼
   ┌───────────────────────────────┐
   │  PERFORM INITIAL SETTINGS FOR │      S13
   │  FILTERS CORRESPONDING TO     │
   │       RESONANCE POINTS        │
   └───────────────────────────────┘
                   │                            ◄──────┐
                   ▼                                   │
   ┌───────────────────────────────┐      S14         │
   │  PERFORM GROUPING FOR FILTERS │                   │
   │   HAVING UNDERGONE INITIAL    │                   │
   │        ADJUSTMENTS            │                   │
   └───────────────────────────────┘                   │
                   │                   S15             │
                   ▼                                    │
            ◇───────────────◇          YES             │
           ╱ CONTINUE PROCESSING? ╲────────────────────┘
            ◇───────────────◇
                   │ NO
                   ▼
            ┌─────────────┐
            │     END     │
            └─────────────┘
```

400-1 CONTROL ASSISTANCE UNIT 400-2 CONTROL ASSISTANCE UNIT

...

400-n CONTROL ASSISTANCE UNIT 100-1 SERVO CONTROL UNIT 100-2 SERVO CONTROL UNIT

...

Figure 12:
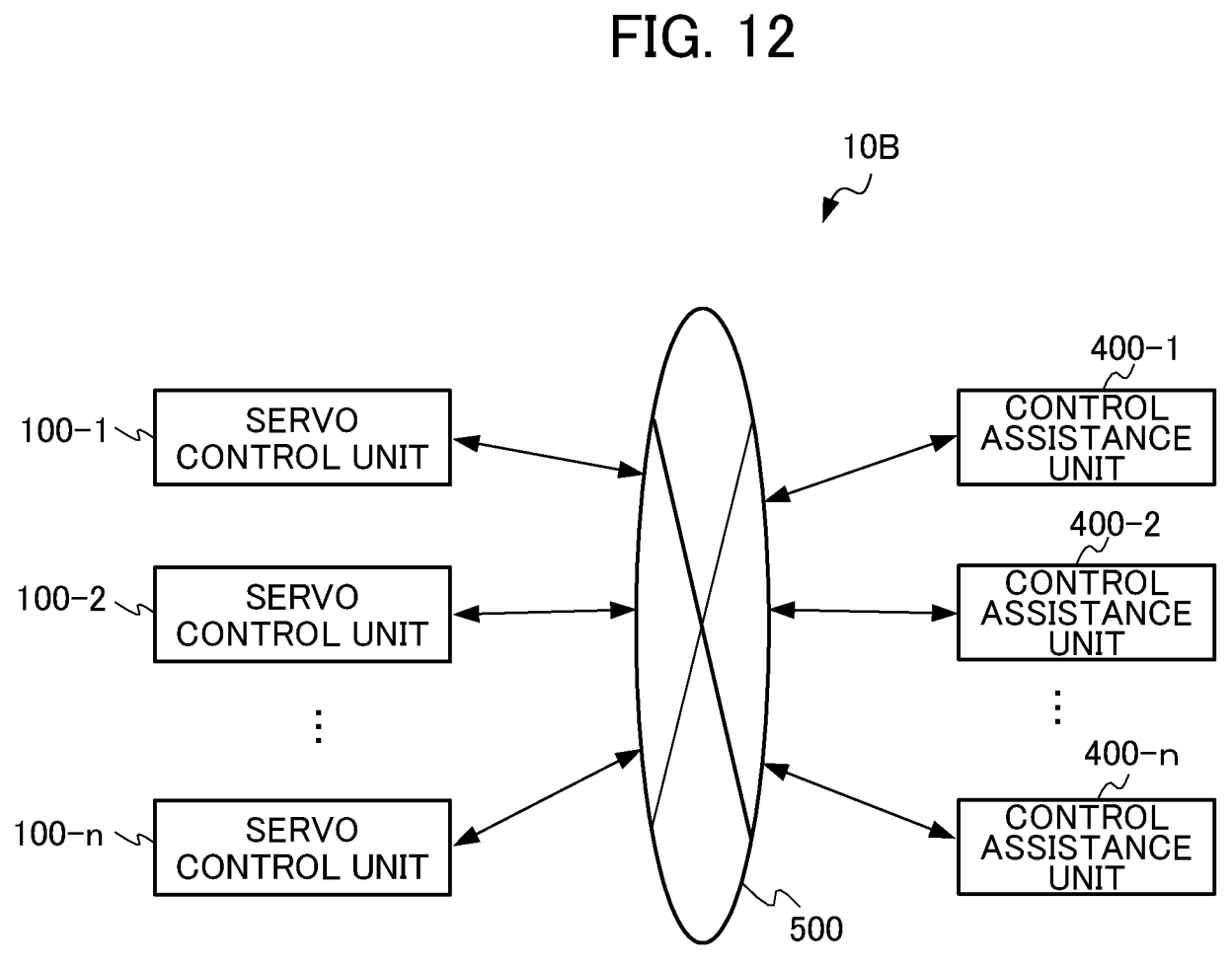

100-n SERVO CONTROL UNIT

CONTROL ASSISTANCE DEVICE, CONTROL SYSTEM, AND FILTER ADJUSTMENT METHOD

TECHNICAL FIELD

The present invention relates to a control assistance device configured to assist in setting a plurality of filters provided in a servo control device configured to control a motor, a control system including the control assistance device and a servo control device, and a filter adjustment method.

BACKGROUND ART

To improve feedback characteristics while keeping stability in a machine where there are a plurality of resonance points, what is demanded is to use a plurality of filters to suppress the plurality of resonance points. For example, Patent Document 1 discloses a control system including a servo control device configured to use a plurality of filters to suppress a plurality of resonance points in a machine where there are such a plurality of resonance points, and a machine learning device configured to optimize the coefficients of the filters. Patent Document 1 discloses the control system that, when there are a plurality of resonance pints in a machine, provides a plurality of filters in a servo control unit (serving as the servo control device) in such a manner as to respectively correspond to the resonance points and connects the filters in series to attenuate all resonances. Then, Patent Document 1 discloses that the machine learning device sequentially acquires, through machine learning, optimal values of the coefficients of a plurality of filters for attenuating the resonance points.

Patent Document 1: Japanese Unexamined Patent Application, Publication No. 2020-57211

DISCLOSURE OF THE INVENTION

Problems to be Solved by the Invention

Although it has been demanded to use a plurality of filters to suppress a plurality of resonance points in a machine where there are such a plurality of resonance points, as described above, the filters to be set in a servo control device are limited in number. Although, to suppress a plurality of resonance points, it is important to determine allocation of filters that are limited in number, it is difficult to search for and determine in a blind manner allocation of filters while suppressing resonances through machine learning or using an optimization algorithm. Therefore, what are demanded are a control assistance device, a control system, and a filter adjustment method that make it possible to determine allocation of filters in such a manner as to satisfy a restriction for the number of filters while realizing suppression of resonance.

Means for Solving the Problems (1) A first aspect of the present disclosure is directed to a control assistance device configured to assist in setting a plurality of first filters provided in a servo control device configured to control a motor, the control assistance device including: a resonance detection unit configured to detect a plurality of resonance points in frequency characteristics in input-output gain of the servo control device, the frequency characteristics being measured based on an input signal and an output signal each having a varying frequency; a filter setting unit configured to set, to suppress the plurality of resonance points, a plurality of second filters that are greater in number than the plurality of first filters; and a grouping unit configured to separately group the plurality of second filters to set the plurality of first filters.

(2) A second aspect of the present disclosure is directed to a control system including: a servo control device configured to control a motor; and the control assistance device according to (1) described above, the control assistance device detecting a plurality of resonance points in frequency characteristics in input-output gain and input-output phase lag of the servo control device, the control assistance device setting, to suppress the plurality of resonance points, a plurality of second filters that are greater in number than a plurality of first filters to be set in the servo control device, the control assistance device separately grouping the plurality of second filters to set the plurality of first filters.

(3) A third aspect of the present disclosure is directed to a filter adjustment assistance method for a control assistance device configured to assist in setting a plurality of first filters provided in a servo control device configured to control a motor, the filter adjustment method including: detecting a plurality of resonance points in frequency characteristics in input-output gain of the servo control device, the frequency characteristics being measured based on an input signal and an output signal each having a varying frequency; setting, to suppress the plurality of resonance points, a plurality of second filters that are greater in number than the plurality of first filters; and separately grouping the plurality of second filters to set the plurality of first filters.

Effects of the Invention

According to the aspects of the present disclosure, it is possible to determine allocation of filters in such a manner as to satisfy a restriction for the number of filters while realizing suppression of resonance.

BRIEF DESCRIPTION OF THE DRAWINGS

FIG. 3 is a view illustrating an example of gain characteristics in input-output gain and setting and grouping filters with respect to a plurality of resonance points.

FIG. 4 is a block diagram illustrating a configuration of a control assistance unit including a frequency characteristics estimation unit, according to the first embodiment.

FIG. 9 is a block diagram illustrating a machine learning unit according to an embodiment of the present invention.

FIG. 10 is a flowchart illustrating operation of the control assistance unit illustrated in FIG. 1.

FIG. 12 is a block diagram illustrating a modification example of the control systems.

PREFERRED MODE FOR CARRYING OUT THE INVENTION

Embodiments of the present disclosure will now be described herein in detail with reference to the accompanying drawings.

First Embodiment

Figure 1:
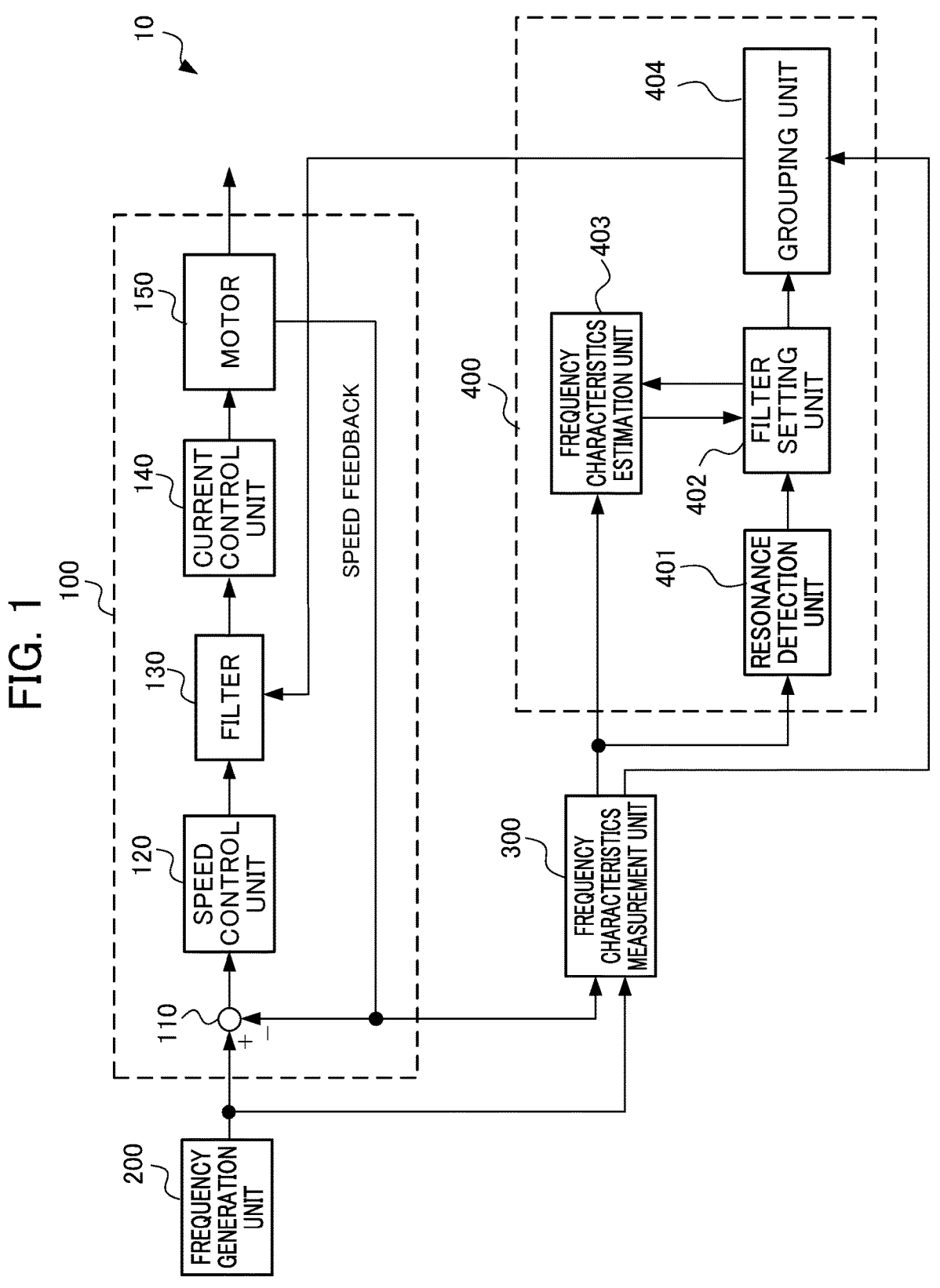
FIG. 1 is a block diagram illustrating a control system according to a first embodiment of the present disclosure.

FIG. 1 is a block diagram illustrating a control system according to a first embodiment of the present disclosure. A control system 10 includes a servo control unit 100, a frequency generation unit 200, a frequency characteristics measurement unit 300, and a control assistance unit 400. The servo control unit 100 corresponds to a servo control device configured to control a motor. The frequency characteristics measurement unit 300 corresponds to a frequency characteristics measurement device. The control assistance unit 400 corresponds to a control assistance device. Note that one or more of the frequency generation unit 200, the frequency characteristics measurement unit 300, and the control assistance unit 400 may be provided in the servo control unit 100. The frequency characteristics measurement unit 300 may be provided in the control assistance unit 400.

The servo control unit 100 includes a subtractor 110, a speed control unit 120, a filter 130, a current control unit 140, and a motor 150. The subtractor 110, the speed control unit 120, the filter 130, the current control unit 140, and the motor 150 configure a servo system of a speed feedback loop. The control assistance unit 400 is configured to detect a plurality of resonance points in frequency characteristics in input-output gain (amplitude ratio) of the servo control unit 100, which have been acquired in a state where the filter 130 is not present, to set, to suppress resonances at the plurality of resonance points, a plurality of filters that are greater in number than a restriction for the number of filters, and to perform grouping for the plurality of filters, the number of filters of which is equal to or less than the restriction for the number of filters. The filter 130 is provided based on a combination of the filters having undergone grouping. FIG. 1 illustrates the servo control unit 100 after the filter 130 that has been set through grouping has been provided.

The motor 150 is a linear motor that performs linear motions or a motor having a rotation shaft, for example. A target to be driven by the motor 150 is, for example, a mechanical part of a machine tool, a robot, or an industrial machine. The motor 150 may be provided as a part of a machine tool, a robot, an industrial machine, or the like. The control system 10 may be provided as a part of a machine tool, a robot, an industrial machine, or the like.

The subtractor 110 is configured to acquire a difference between an inputted speed command and a detection speed that has been provided as speed feedback, and to output the difference to the speed control unit 120 as a speed error.

The speed control unit 120 is configured to perform proportional-integral control (PI control), to add an integrated value acquired by multiplying the speed error by an integral gain K1$v$ and a value acquired by multiplying the speed error by a proportional gain K2$v$, and to output the acquired value to the filter 130 as a torque command. The speed control unit 120 contains a feedback gain. Note that the speed control unit 120 is not particularly limited to use the PI control, but may also use other controls such as proportional-integral-differential control (PID control). Mathematical equation 1 (indicated below as Equation 1) represents a transfer function $G_V(s)$ of the speed control unit 120.

$$G_V(s) = \frac{K1v}{s} + K2v \qquad \text{[Equation 1]}$$

The filter 130 is configured by connecting in series a plurality of filters for attenuating a specific frequency component. Each of the filters is a notch filter, a low-pass filter, or a band-stop filter, for example. In a machine such as a machine tool having a mechanical part to be driven by the motor 150, there may be a plurality of resonance points, resulting in an increase in each resonance in the servo control unit 100. By connecting the filters such as the notch filters in series, it is possible to reduce such an increase in each resonance at a plurality of resonance points. An output of the filter 130 is outputted as a torque command to the current control unit 140.

Figure 2:
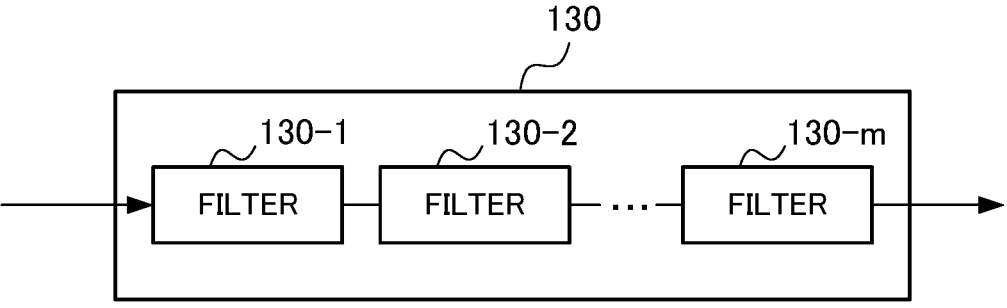
FIG. 2 is a block diagram illustrating an example where a plurality of filters are directly connected to each other to configure a filter.

FIG. 2 is a block diagram illustrating an example where a plurality of filters are directly connected to each other to configure the filter 130. In FIG. 2, when there are k (k represents a natural number of 2 or more) resonance points, m filters 130-1 to 130-$m$ (m represents a natural number of 2 or more, and m<k is to be satisfied) are connected in series to configure the filter 130. The m filters 130-1 to 130-$m$ respectively correspond to frequency bandwidths different from each other. The filter 130 will be described below as one that the m filters 130-1 to 130-$m$ configure. As for the number of filters configuring the filter 130, which is represented by m, the filters to be set in the servo control unit 100 are limited in number, i.e., there is a restriction for the number of filters. Therefore, it is difficult to provide filters at the same number as the k resonance points. When a restriction for the number of filters is represented by a number of filters Nmax, the control assistance unit 400 determines allocation of m filters for the k resonance points to allow the number of the m filters to be equal to or less than the number of filters Nmax. Mathematical equation 2 (indicated below as Equation 2) represents a transfer function $G_F(S)$ of a notch filter serving as the filter 130-1, for example, which is one in the filter 130. It is possible to configure each of the filters 130-2 to 130-$m$ with a notch filter with a similar transfer function. The coefficient δ in Mathematical equation 2 represents an attenuation coefficient, the coefficient $\omega_c$ represents a central angle frequency, and the coefficient T represents a fractional bandwidth. When the central frequency is represented by fc and the bandwidth is represented by fw, the coefficient $\omega_c$ is represented by $\omega_c=2\pi fc$, and the coefficient $\tau$ is represented by $\tau=fw/fc$.

$$G_F(s) = \frac{s^2 + 2\delta\tau\omega_c s + \omega_c^2}{s^2 + 2\tau\omega_c s + \omega_c^2} \qquad \text{[Equation 2]}$$

The current control unit 140 is configured to generate a voltage command for driving the motor 150 based on the torque command, and to output the voltage command to the motor 150. When the motor 150 is a linear motor, the position of a movable part is detected by a linear scale (not shown) provided in the motor 150, a position detection value is differentiated to acquire a speed detection value, and the acquired speed detection value is inputted as speed feedback to the subtractor 110. When the motor 150 is a motor having a rotation shaft, a rotation angle position is detected by a rotary encoder (not shown) provided in the motor 150, and a speed detection value is inputted as speed feedback to the subtractor 110.

The servo control unit 100 is configured as described above. In addition to the servo control unit 100, the control system 10 further includes the frequency generation unit 200, the frequency characteristics measurement unit 300, and the control assistance unit 400. The frequency characteristics measurement unit 300 may be included in the control assistance unit 400.

The frequency generation unit 200 is configured to output a sinusoidal signal, while sequentially changing its frequency, as a speed command, to the subtractor 110 of the servo control unit 100 and the frequency characteristics measurement unit 300.

The frequency characteristics measurement unit 300 is configured to use the speed command (sinusoidal wave) serving as an input signal, which has been generated by the frequency generation unit 200, and a detection speed (sinusoidal wave) serving as an output signal, which is to be outputted from the rotary encoder (not shown), to measure, per frequency specified by the speed command, an amplitude ratio (input-output gain) and a phase lag between the input signal and the output signal. Otherwise, the frequency characteristics measurement unit 300 uses the speed command (sinusoidal wave) serving as an input signal, which has been generated by the frequency generation unit 200, and a differential (sinusoidal wave) of a detection position serving as an output signal, which is to be outputted from the linear scale, to measure, per frequency specified by the speed command, an amplitude ratio (input-output gain) and a phase lag between the input signal and the output signal.

When the servo control unit 100 operates in a state where the filter 130 is not provided, the frequency characteristics measurement unit 300 at least measures frequency characteristics in input-output gain and phase lag, and outputs the frequency characteristics in input-output gain and phase lag to a resonance detection unit 401 and a frequency characteristics estimation unit 403, described later, of the control assistance unit 400. When the servo control unit 100 operates in a state where some or all filters among the m filters 130-1 to 130-$m$ in the filter 130 are provided, the frequency characteristics measurement unit 300 measures frequency characteristics in input-output gain and phase lag, and outputs the frequency characteristics in input-output gain and phase lag to a grouping unit 404, described later, of the control assistance unit 400.

Figure 3:
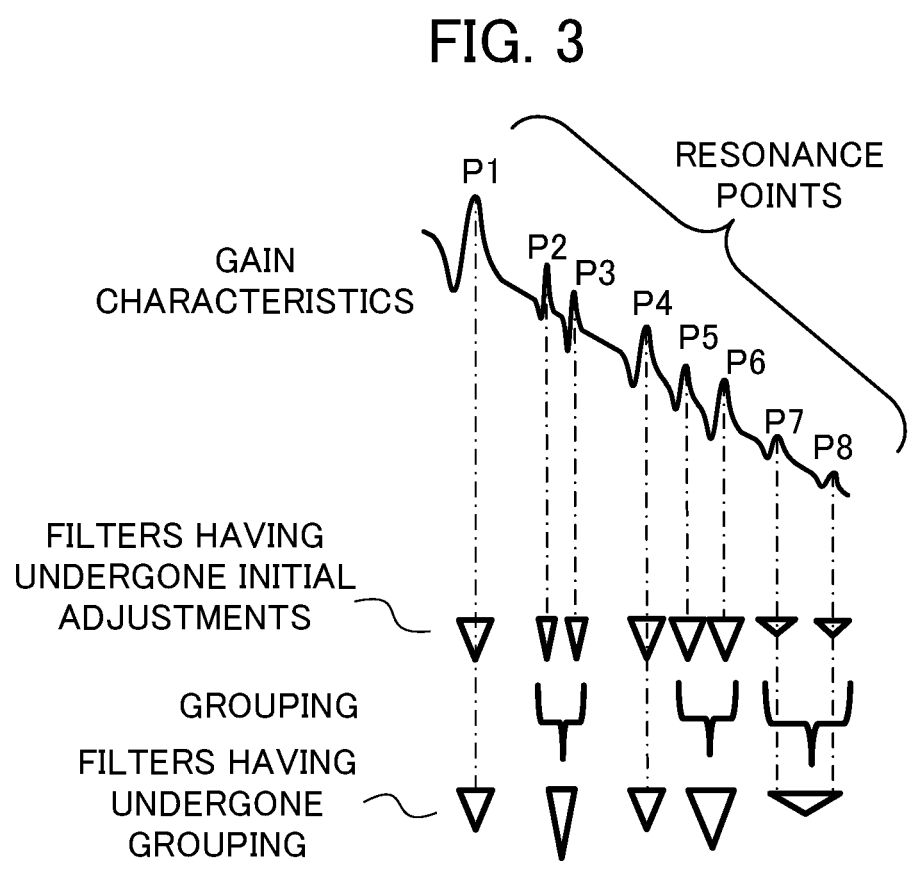

When the servo control unit 100 operates in a state where the filter 130 is not provided, as illustrated in FIG. 3, the control assistance unit 400 detects k resonance points in input-output gain that the frequency characteristics measurement unit 300 outputs. Then, to suppress resonances at the detected k resonance points, the control assistance unit 400 performs, for example, initial adjustments for each of the coefficients (the coefficients $\omega_c$, $\tau$, and $\delta$ in Mathematical equation 2) of $n_{ini}$ filters that are greater in number than the number of filters Nmax representing the restriction for the number of filters, performs grouping for the $n_{ini}$ filters, and sets the filter 130 where the number of the m filters is less than the number of the $n_{ini}$ filters that have undergone the initial adjustments and is equal to or less than the number of filters Nmax ($n_{ini}$>m, Nmax≥m). The m filters are regarded as a plurality of first filters, while the $n_{ini}$ filters are regarded as a plurality of second filters.

The number $n_{ini}$ may be equal to, greater than, or less than the number k. That is, for the k resonance points, a plurality of filters may be provided for one resonance point, one filter may be provided for a plurality of resonance points, and k filters ($n_{ini}$=k) may be provided for k resonance points. Note that, even when the number of the k resonance points is equal to or less than the number of filters Nmax, performing initial adjustments may be required for each of the coefficients of the $n_{ini}$ filters. One reason for this is that, when a plurality of filters are provided for one resonance point, $n_{ini}$>k is satisfied, resulting in that the number of the $n_{ini}$ filters may be greater than the number of filters Nmax. The number of the $n_{ini}$ filters provided to suppress resonances at the k resonance points has been set to a number greater than the number of filters Nmax representing the restriction for the number of filters. However, even when the number of the $n_{ini}$ filters is equal to or less than the number of filters Nmax, grouping may be performed for the $n_{ini}$ filters to set the filter 130 where the number of m filters is equal to or less than the number of filters Nmax ($n_{ini}$>m). One reason for this is that, even when an object function such as a cutoff frequency has deteriorated, a smaller number of filters may be preferable in some cases.

FIG. 3 is a view illustrating an example of gain characteristics in input-output gain and setting and grouping filters with respect to a plurality of resonance points. FIG. 3 illustrates a state where there have been generated eight resonance points P1 to P8, initial adjustments have been performed for each of the coefficients of eight filters to suppress the resonance points P1 to P8, and one filter is set, through grouping, for each of the resonance points P2 and P3, the resonance points P5 and P6, and the resonance points P7 and P8.

Details of the configuration and operation of the control assistance unit 400 will now be described below.

<Control Assistance Unit 400>

As illustrated in FIG. 1, the control assistance unit 400 includes the resonance detection unit 401, a filter setting unit 402, the frequency characteristics estimation unit 403, and the grouping unit 404.

The resonance detection unit 401 is configured to acquire, when the servo control unit 100 operates in a state where the filter 130 is not provided, from the frequency characteristics measurement unit 300, frequency characteristics in input-output gain (amplitude ratio) of the servo control unit 100 to detect k resonance points in the frequency characteristics in input-output gain (gain characteristics). The resonance detection unit 401 may detect anti-resonance points, instead of resonance points. Detecting the anti-resonance points allows the filter setting unit 402, when setting a range of attenuation center frequency for each filter in $n_{ini}$ ($n_{ini}$>m) filters, to set the range of attenuation center frequency between the frequencies at the anti-resonance points.

The filter setting unit 402 is configured to set $n_{ini}$ filters corresponding to the k resonance points, and to cooperate with the frequency characteristics estimation unit 403 to perform, per filter, initial adjustments for the coefficients of the $n_{ini}$ filters. The grouping unit 404 is configured to perform grouping for the $n_{ini}$ filters having undergone the initial adjustments to set m (k>m) filters.

How the filter setting unit 402 performs initial adjustments for filters and how the grouping unit 404 performs grouping will now be described below. As described above, the number of the $n_{ini}$ filters that undergo initial adjustments may be greater than the number of filters Nmax serving as the restriction for the number of filters, or may be equal to or less than the number of filters Nmax. Furthermore, the number of the $n_{ini}$ filters may be greater than the number of the k resonance points, or may be equal to or less than the number of the k resonance points. The number of the m filters is equal to or less than the number of filters Nmax, and is less than the number of the $n_{ini}$ filters. In the below description, the number of the $n_{ini}$ filters that undergo initial adjustments is greater than the number of filters Nmax, and is equal to the number of the k resonance points ($n_{ini}$>Nmax, $n_{ini}$=k). Since the number of the $n_{ini}$ filters that undergo initial adjustments is greater than the number of filters Nmax, in the below description, the frequency characteristics estimation unit 403 is used to estimate frequency characteristics in input-output gain. However, when the number of the $n_{ini}$ filters that undergo initial adjustments is not greater than the number of filters Nmax, the frequency characteristics estimation unit 403 may be used to estimate frequency characteristics in input-output gain, or the servo control unit 100 may be caused to actually operate and the frequency characteristics measurement unit 300 may be used to measure frequency characteristics in input-output gain.

(Initial Adjustments for Filters)

Operation of the filter setting unit 402 and the configuration and operation of the frequency characteristics estimation unit 403 for performing initial adjustments, per filter, for the coefficients $\omega_c$, $\tau$, and $\delta$ of k filters (k=$n_{ini}$) will now be described below. The filter setting unit 402 selects a resonance point one by one from k resonance points, sets each of the coefficients $\omega_c$, $\tau$, and $\delta$ of one filter for attenuating resonances at the selected resonance point, and sequentially outputs each of the set coefficients to the frequency characteristics estimation unit 403.

Based on each of the coefficients $\omega_c$, $\tau$, and $\delta$ of the one filter, which is acquired from the filter setting unit 402, and frequency characteristics in input-output gain and phase lag, which are acquired from the frequency characteristics measurement unit 300, when the servo control unit 100 is caused to operate in a state where the filter 130 is not provided, the frequency characteristics estimation unit 403 acquires an estimated value of the frequency characteristics in input-output gain of the servo control unit 100 when the one filter is set in the filter 130, and outputs the estimated value to the filter setting unit 402.

Figure 4:
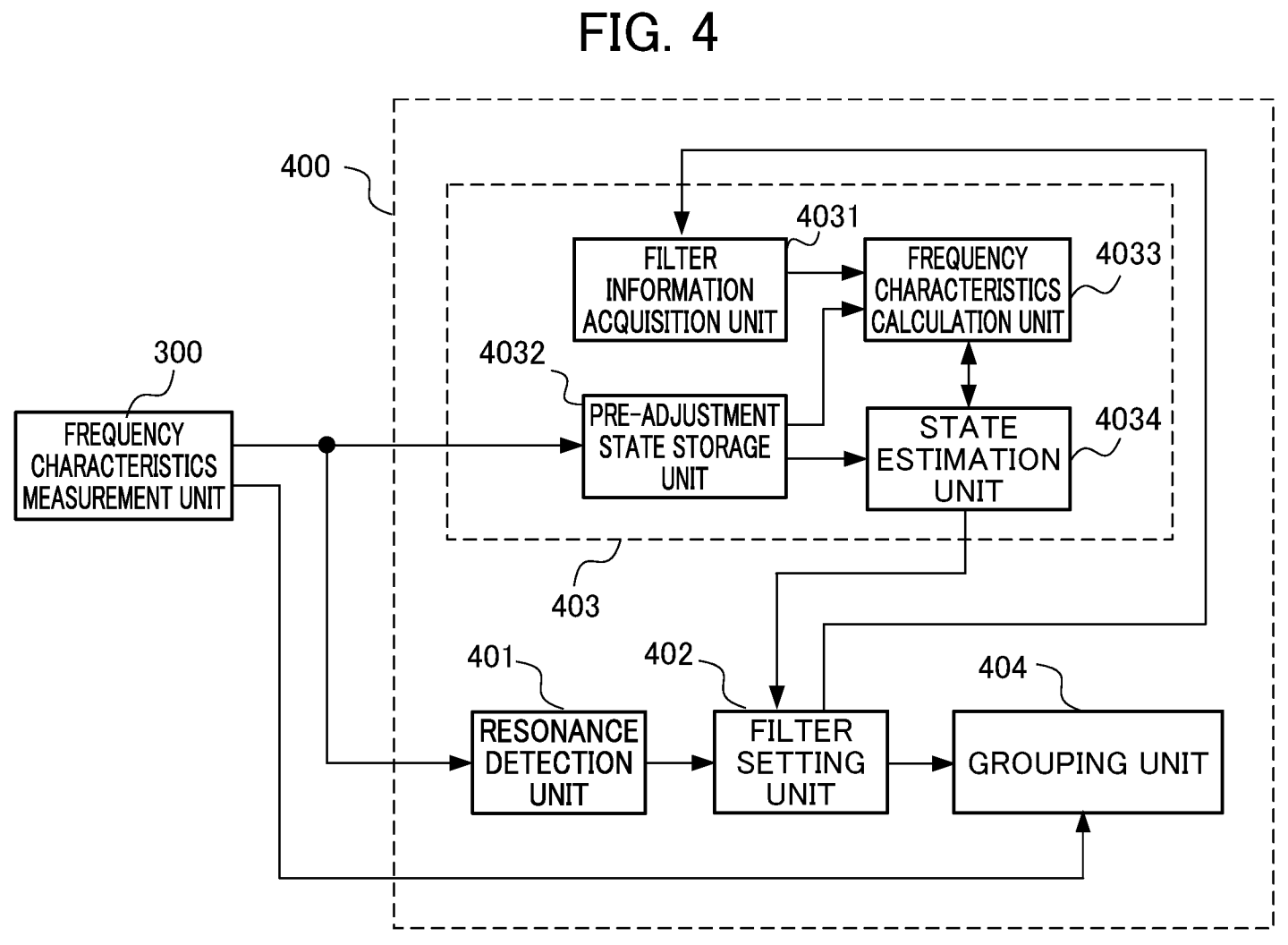

FIG. 4 is a block diagram illustrating the configuration of the control assistance unit including the frequency characteristics estimation unit. FIG. 4 further illustrates the frequency characteristics measurement unit 300 for describing the operation of the frequency characteristics estimation unit 403. As illustrated in FIG. 4, the frequency characteristics estimation unit 403 includes a filter information acquisition unit 4031, a pre-adjustment state storage unit 4032, a frequency characteristics calculation unit 4033, and a state estimation unit 4034.

The filter information acquisition unit 4031 is configured to acquire each of the coefficients $\omega_c$, $\tau$, and $\delta$ of one filter from the filter setting unit 402, and to output each of the acquired coefficients to the frequency characteristics calculation unit 4033.

The pre-adjustment state storage unit 4032 is configured to store, when the servo control unit 100 operates in a state where the filter 130 is not provided, as described above, frequency characteristics $C_1$ in input-output gain and phase lag, which are acquired from the frequency characteristics measurement unit 300.

The frequency characteristics calculation unit 4033 is configured to acquire each of the coefficients $\omega_c$, $\tau$, and $\delta$ of the one filter from the filter information acquisition unit 4031, and to read the frequency characteristics $C_1$ from the pre-adjustment state storage unit 4032. Then, the frequency characteristics calculation unit 4033 uses the transfer function $G_F(j\omega)$ of Mathematical equation 2, which has been set with each of the coefficients $\omega_c$, $\tau$, and $\delta$ of the one filter, to calculate frequency characteristics $C_2$ in input-output gain and phase lag of the one filter.

Then, the frequency characteristics calculation unit 4033 outputs, to the state estimation unit 4034, the measured frequency characteristics $C_1$ in input-output gain and phase lag of the servo control unit 100 and the calculated frequency characteristics $C_2$ in input-output gain and phase lag of the filter.

The state estimation unit 4034 is configured to add the frequency characteristics $C_1$ and the frequency characteristics $C_2$, to acquire an estimated value E (E=$C_1$+$C_2$) of frequency characteristics in input-output gain and phase lag of the servo control unit 100 provided with the one filter, and to output the acquired estimated value to the filter setting unit 402. In the estimated value E of the frequency characteristics in input-output gain and phase lag, an estimated value of the frequency characteristics in input-output gain will be referred to as $E_1$, while an estimated value of the frequency characteristics in phase lag will be referred to as $E_2$. The filter setting unit 402 is able to set one filter in the servo control unit 100 based on the estimated value $E_1$ of the frequency characteristics in input-output gain of the servo control unit 100 to determine whether resonances at the selected resonance point are attenuated to fall within an allowable range.

Figure 5:
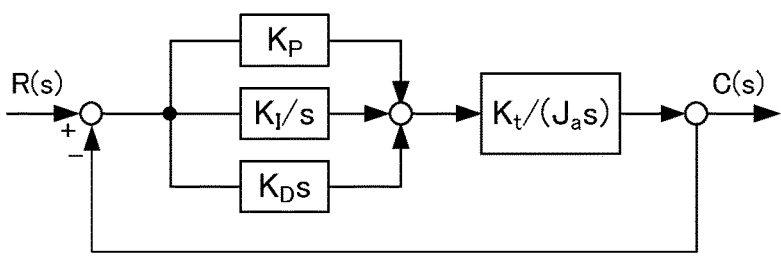
FIG. 5 is a block diagram illustrating a model used to calculate a normative model in input-output gain.

The filter setting unit 402 determines whether resonances at the selected resonance point are attenuated to fall within the allowable range, as described below. The filter setting unit 402 has stored beforehand a normative model in input-output gain of the servo control unit 100. The normative model represents a model of a servo control unit, which has ideal characteristics that do not cause resonances to occur. It is possible to acquire the normative model through calculation using, for example, an inertia Ja, a torque constant $K_t$, a proportional gain $K_p$, an integral gain $K_I$, and a differential gain $K_D$ of the model illustrated in FIG. 5. The inertia Ja represents a value acquired by adding a motor inertia and a machine inertia.

Figure 6:
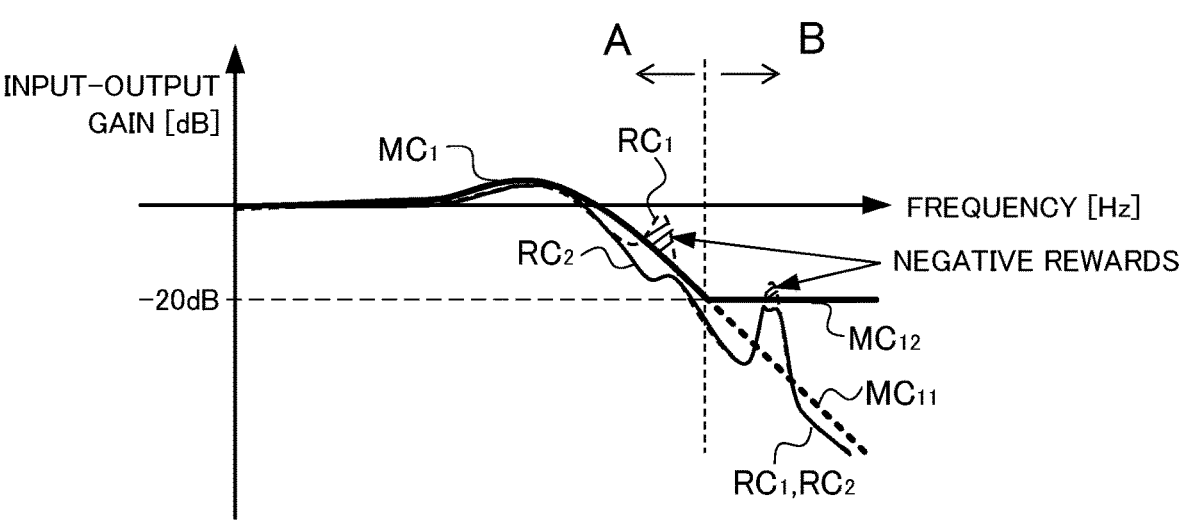
FIG. 6 is a characteristic diagram illustrating frequency characteristics in input-output gain of a servo control unit, according to the normative model, and an estimated value of the frequency characteristics in input-output gain of the servo control unit.

FIG. 6 is a characteristic diagram illustrating frequency characteristics in input-output gain of the servo control unit, according to the normative model, and an estimated value of frequency characteristics in input-output gain of the servo control unit 100. As illustrated in the characteristic diagram of FIG. 6, the normative model includes a zone A representing a frequency zone having an ideal input-output gain of a constant input-output gain or greater, that is, an ideal input-output gain of −20 dB, for example, and a zone B representing a frequency zone in which an input-output gain is less than the constant input-output gain. In the zone A in FIG. 6, a curve MCi (bold line) illustrates the ideal input-output gain of the normative model. In the zone B in FIG. 6, a curve $MC_{11}$ (bold broken line) illustrates an ideal, virtual input-output gain of the normative model, and a straight line $MC_{12}$ (bold line) illustrates when the input-output gain of the normative model has a constant value. In the zones A and B in FIG. 6, curves $RC_1$ and $RC_2$ respectively illustrate the curve of the estimated value $E_1$ of the input-output gain of the servo control unit.

The filter setting unit 402 determines, in a band centered around the selected resonance point, in the zone A, when the curve $RC_1$ of the estimated value $E_1$ of the input-output gain lies below the curve MCi of the ideal input-output gain of the normative model, that resonances at the selected resonance point are attenuated to fall within the allowable range, and determines, when the curve $RC_1$ lies above the curve MCi, that resonances at the selected resonance point are not attenuated to fall within the allowable range. In the zone B within which the frequency exceeds one at which the input-output gain becomes sufficiently small, even when the curve $RC_1$ of the estimated value $E_1$ of the input-output gain lies above the curve $MC_{11}$ of the ideal virtual input-output gain of the normative model, the influence on stability is small.

Therefore, in the zone B, as described above, the input-output gain of the normative model does not follow the curve $MC_{11}$ of the ideal gain characteristics, but follows the straight line $MC_{12}$ of the input-output gain (for example, –20 dB) at the constant value. The filter setting unit 402 determines, in the band centered around the selected resonance point, when the curve $RC_1$ of the estimated value $E_1$ of the input-output gain lies below the straight line $MC_{12}$ of the input-output gain at the constant value, that resonances at the selected resonance point are attenuated to fall within the allowable range, and determines, when the curve $RC_1$ lies above the straight line $MC_{12}$, since there is a possibility of instability, that resonances at the selected resonance point are not attenuated to fall within the allowable range.

The filter setting unit 402 stores, when resonances at the selected resonance point are attenuated to fall within the allowable range, each of the coefficients $\omega_c$, $\tau$, and $\delta$ of the one filter. The filter setting unit 402 changes each of the coefficients $\omega_c$, $\tau$, and $\delta$ of the one filter and outputs the changed coefficient to the frequency characteristics estimation unit 403, and repeats the processing described above. The filter setting unit 402 thus acquires an aggregation of the respective coefficients $\omega_c$, $\tau$, and $\delta$ of the one filter, with which resonances at the selected resonance point are attenuated to fall within the allowable range.

The filter setting unit 402 acquires a cutoff frequency from the estimated value $E_2$ of the frequency characteristics in phase lag, which correspond to an aggregation of the respective coefficients $\omega_c$, $\tau$, and $\delta$ of the one filter, with which resonances at the selected resonance point are attenuated to fall within the allowable range, and determines the coefficients $\omega_c$, $\tau$, and $\delta$, with which the cutoff frequency becomes the highest, as the respective coefficients $\omega_c$, T, and 5 of the one filter. The cutoff frequency is, for example, a frequency at which gain characteristics on a bode diagram, which are acquired by measuring a frequency response calculated from an input-output gain of the servo control unit 100, correspond to –3 dB, or a frequency at which phase characteristics correspond to –180 degrees. As the cutoff frequency increases, the feedback gain increases and the response speed increases. Next, the filter setting unit 402 selects another resonance point from the k resonance points, sets each of the coefficients $\omega_c$, $\tau$, and $\delta$ of another one filter for attenuating resonances at the selected other resonance point, and outputs the set coefficient to the frequency characteristics estimation unit 403.

The filter setting unit 402 and the frequency characteristics estimation unit 403 cooperate, sequentially perform operation of determining each of the coefficients $\omega_c$, T, and 5 of each of the filters, as described above, for the k filters, determine each of the coefficients $\omega_c$, $\tau$, and $\delta$ of each of the k filters corresponding to the k resonance points, and perform initial adjustments, per filter, for the coefficients of the k filters. The filter setting unit 402 outputs the coefficients of the k filters, which have undergone the initial adjustments, to the grouping unit 404.

In the above description, the servo control unit 100 where the filter 130 is not provided has been caused to operate to acquire frequency characteristics in input-output gain (amplitude ratio) and phase lag, and to detect resonance points, the frequency characteristics in input-output gain and phase lag when the filter 130 is not provided may also be acquired using other methods. For example, each of the coefficients $\omega_c$, $\tau$, and $\delta$ of the filter 130 is used to calculate frequency characteristics in input-output gain and phase lag of the filter 130. Then, the servo control unit 100 provided with the filter 130 is caused to operate to acquire frequency characteristics in input-output gain and phase lag and, from the frequency characteristics, the frequency characteristics in input-output gain and phase lag of the filter 130 are subtracted, making it possible to acquire frequency characteristics in input-output gain and phase lag when the filter 130 is not provided.

(Grouping of Filters)

Next, operation that the grouping unit 404 performs grouping for k filters having undergone initial adjustments and sets m filters that are equal to or less than the number of filters Nmax (k>m, Nmax≥m) representing the restriction for the number of filters will now be described below. To set the k filters having undergone the initial adjustments into m (k>m) filters, the grouping unit 404 sets a combination of filters provided with one or more filters each of which a plurality of filters adjacent to each other in the k filters are combined into one. Otherwise, the grouping unit 404 sets a combination of filters provided with one or more sets of two or more filters, each of which three or more filters adjacent to each other in the k filters are combined into two or more that are less in number than the three or more filters adjacent to each other. As methods for performing grouping for k filters into m filters, for example, there are four methods described below. In the below description, examples will be described, where, to set k filters having undergone initial adjustments into m (k>m) filters, provided is one or more filters each of which a plurality of filters adjacent to each other are combined into one (hereinafter this filter will be referred to as a composite filter).

(1) Full Search for Combinations of Filters

The number of the combinations of filters when a composite filter in which a plurality of filters adjacent to each other are combined into one is provided to set k filters into m filters corresponds to the number of (m–1) partitions selected from (k–1) partitions partitioning the k filters, and is represented by $_{(k-1)}C_{(m-1)}$. The grouping unit 404 calculates $_{(k-1)}C_{(m-1)}$ combinations of filters, and, in one combination of filters, adjusts each of the coefficients $\omega_c$, $\tau$, and $\delta$ of the composite filter one by one. The grouping unit 404 sets, for the one combination of filters, a combination of filters including one composite filter, as the filter 130, in the servo control unit 100. Then, the grouping unit 404 adjusts the coefficients of the one composite filter to allow frequency characteristics in input-output gain, which are acquired by causing the servo control unit 100 to operate, to lie below the curve of the ideal frequency characteristics in input-output gain of the normative model described with reference to FIGS. 5 and 6, similarly to the operation of the filter setting unit 402, and to make the cutoff frequency highest.

The grouping unit 404 further performs, when there are other composite filters than the one composite filter in the one combination of filters, described above, adjustments in a similar manner for the coefficients of the other composite filters. In such a manner, a combination of filters in which the coefficients of one or more composite filters have been adjusted is regarded as one grouping candidate. As one grouping candidate is acquired, the grouping unit 404 acquires another grouping candidate for another combination.

The grouping unit 404 repeats the operation described above to acquire $_{(k-1)}C_{(m-1)}$ grouping candidates, to acquire a value of the object function such as a cutoff frequency of each of the acquired $_{(k-1)}C_{(m-1)}$ groupings, and to select a grouping candidate with which the value of the object function becomes the best as an optimal combination. When the object function is a cutoff frequency, a grouping candidate with which the cutoff frequency becomes highest is selected as an optimal combination.

Figure 7:
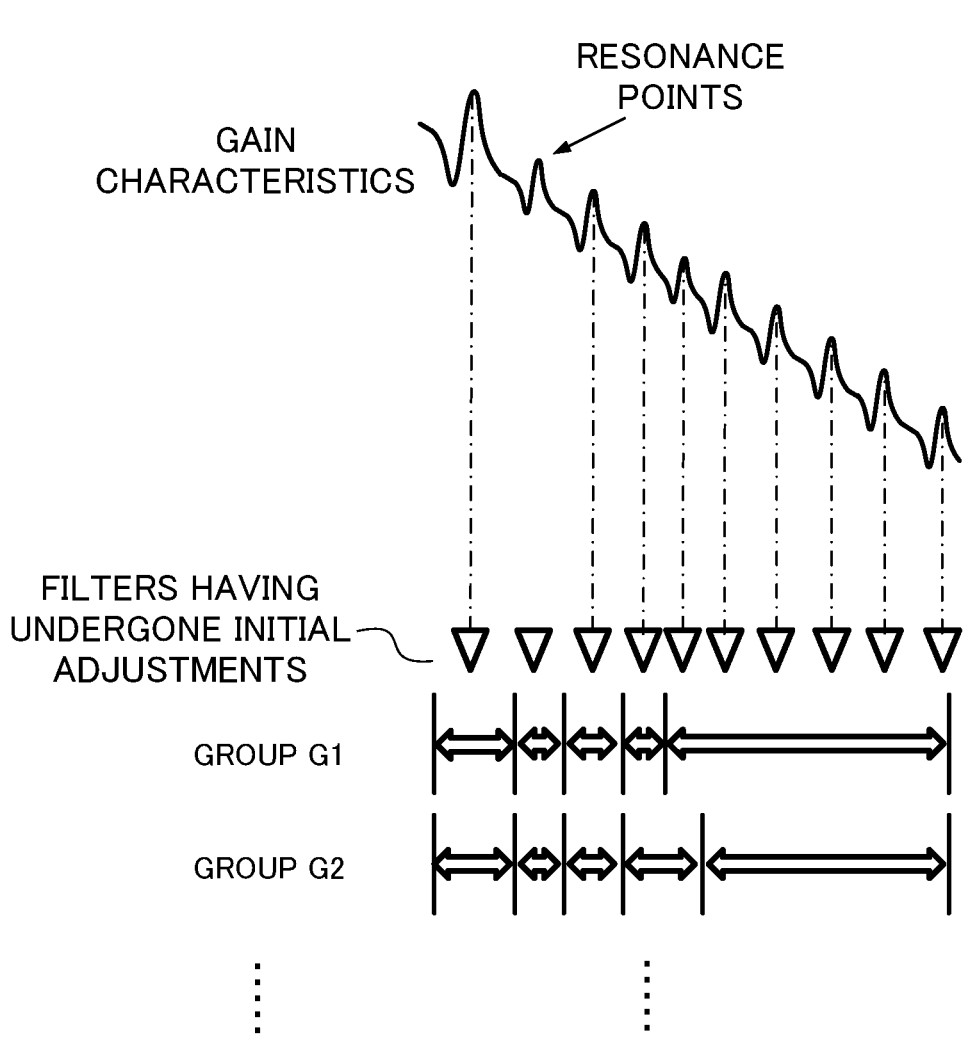
FIG. 7 is a view illustrating an example of gain characteristics in input-output gain and setting and grouping filters with respect to a plurality of resonance points.

FIG. 7 is a view illustrating an example of gain characteristics in input-output gain and setting and grouping filters with respect to a plurality of resonance points. In FIG. 7, an example is illustrated, where there have been generated 10 resonance points, initial adjustments have been performed for each of the coefficients of 10 filters to suppress the 10 resonance points, and grouping for the 10 filters into 5 filters has been performed. In FIG. 7, a group G1 and a group G2 are examples when performing grouping of different combinations of filters. When full search is performed for the combinations of filters, the number of the combinations of filters, in which grouping of the 10 filters into 5 filters is performed, as illustrated in FIG. 7, is represented by $_9C_4$. Furthermore, the number of the combinations of filters, in which grouping of the 10 filters into 5 or less filters is performed, is represented by $(_9C_4+_9C_3+_9C_2+_9C_1)$.

(2) Search Using Machine Learning

Figure 8:
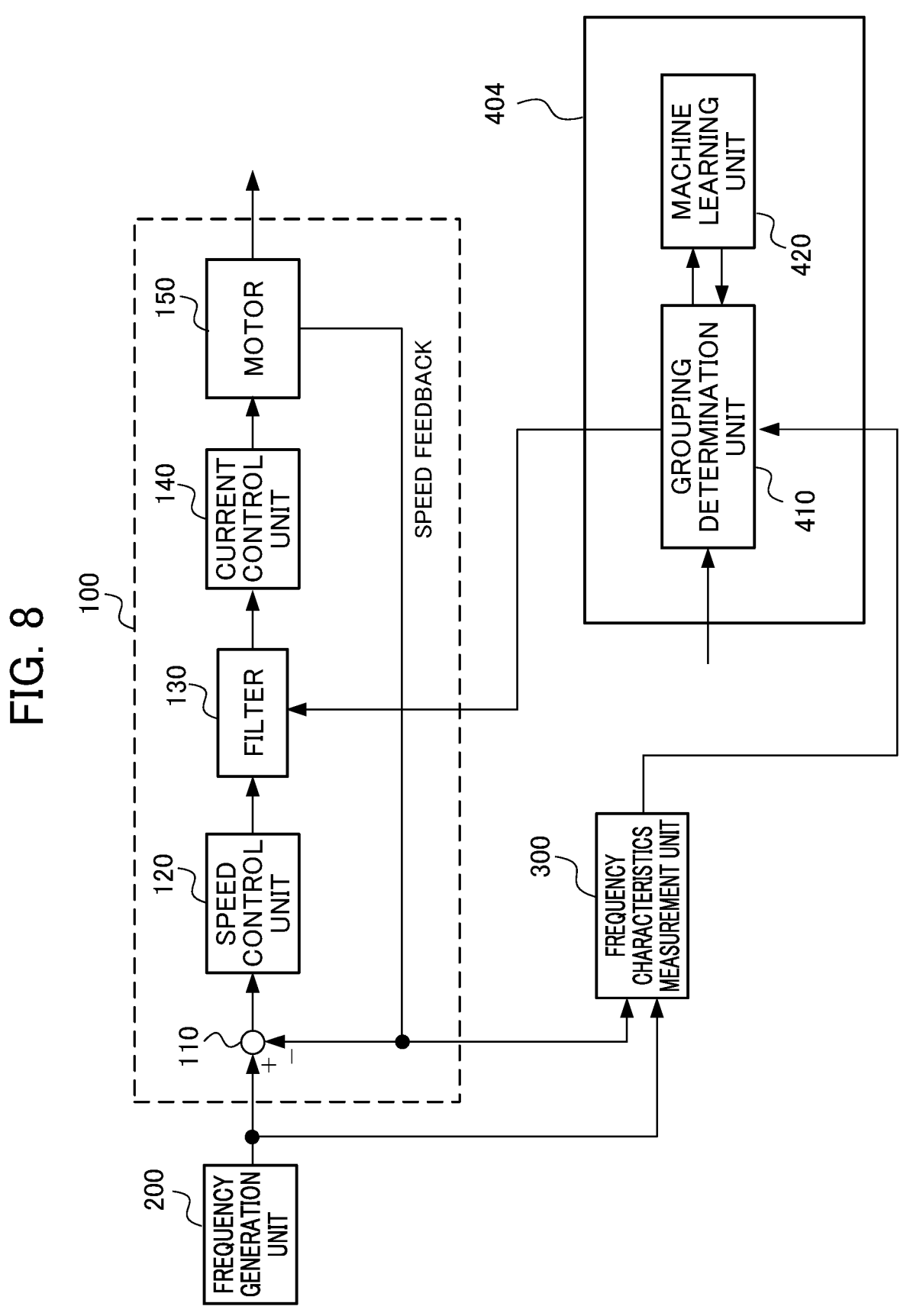
FIG. 8 is a block diagram illustrating a configuration of a part of the control system, centered around a grouping unit.

When performing a search using machine learning, the grouping unit 404 includes, as illustrated in FIG. 8, a grouping determination unit 410 and a machine learning unit 420. FIG. 8 is a block diagram illustrating a configuration of a part of the control system, centered around the grouping unit. The machine learning unit 420 is configured to set, to cause the filter setting unit 402 to set k filters having undergone initial adjustments into (k>m) filters, a combination of filters provided with one or more composite filters each of which a plurality of filters adjacent to each other in the k filters are combined into one. Note that the grouping determination unit 410 may be configured to set a combination of filters, and the grouping determination unit 410 may be configured to output the combination of filters to the machine learning unit 420.

The machine learning unit 420 first acquires, from the filter setting unit 402, via the grouping determination unit 410, the coefficients of the k filters having undergone the initial adjustments. Furthermore, the machine learning unit 420 provides one or more composite filters, and sets, in one combination in which the k filters having undergone the initial adjustments are set into m filters, a combination of filters including one composite filter, as the filter 130, in the servo control unit 100. Then, the machine learning unit 420 acquires, from the frequency characteristics measurement unit 300, frequency characteristics in input-output gain, which are acquired by causing the servo control unit 100 to operate. The machine learning unit 420 performs machine learning to allow the acquired frequency characteristics in input-output gain to lie below the curve of the ideal frequency characteristics in input-output gain of the normative model described with reference to FIGS. 5 and 6, similarly to the operation of the filter setting unit 402, and to make the cutoff frequency highest, to adjust the coefficients $\omega_c$, $\tau$, and $\delta$ of the one composite filter. The operation of setting a combination of filters including one composite filter as the filter 130 and the operation of acquiring frequency characteristics in input-output gain and phase lag from the frequency characteristics measurement unit 300 are performed via the grouping determination unit 410. Note that the machine learning unit 420 may directly set a combination of filters including one composite filter as the filter 130, instead of setting it via the grouping determination unit 410, and may acquire frequency characteristics in input-output gain and phase lag from the frequency characteristics measurement unit 300. When there are other composite filters than the one composite filter in the one combination of filters, described above, the coefficients of the other composite filters are also adjusted in a similar manner. In such a manner, a combination of filters in which the coefficients of one or more composite filters have been adjusted is regarded as one grouping candidate.

An example of the operation of the machine learning unit 420 as described above will now be specifically described with reference to FIG. 3. FIG. 3 will be used in here as an explanatory diagram when acquiring one grouping candidate. In the gain characteristics in input-output gain, there have been generated eight resonance points P1 to P8, and the machine learning unit 420 sets a combination of filters in which one composite filter is set for the resonance points P2 and P3, one composite filter is set for the resonance points P5 and P6, and one composite filter is set for the resonance points P7 and P8, respectively, for example. The machine learning unit 420 sets, as the filter 130, a combination of filters including one composite filter that is set for the resonance points P2 and P3, for example. At this time, no composite filters have been set for the resonance points P5 and P6 and the resonance points P7 and P8. The machine learning unit 420 acquires frequency characteristics in input-output gain, which are acquired by causing the servo control unit 100 including the filter 130 provided with the composite filter set for the resonance points P2 and P3 to operate. The machine learning unit 420 performs machine learning to allow the acquired frequency characteristics in input-output gain to lie below the curve of the ideal frequency characteristics in input-output gain of the normative model described with reference to FIGS. 5 and 6, similarly to the operation of the filter setting unit 402, and to make the cutoff frequency highest, to adjust the coefficients of the composite filter that is set for the resonance points P2 and P3. After that, the machine learning unit 420 adjusts in a similar manner the coefficients of the composite filter that is set for the resonance points P5 and P6 and the coefficients of the composite filter that is set for the resonance points P7 and P8. In such a manner, it has been acquired, as one grouping candidate, a combination of filters in which the coefficients of the three composite filters respectively provided for the resonance points P2 and P3, the resonance points P5 and P6, and the resonance points P7 and P8 have been adjusted.

The machine learning unit 420 provides, when it has been acquired one grouping candidate, one or more composite filters, and acquires grouping candidates of other combinations where the k filters having undergone the initial adjustments are set into m filters. This operation is repeated, and the machine learning unit 420 sequentially outputs each of the coefficients $\omega_c$, $\tau$, and $\delta$ of the filters in the combinations of filters serving as the grouping candidates to the grouping determination unit 410. Details of the configuration and operation of the machine learning unit 420 will be described later.

The grouping determination unit 410 sets a combination of filters serving as one grouping candidate acquired by the machine learning unit 420 as the filter 130, causes the servo control unit 100 to operate, and uses frequency characteristics in phase lag of the servo control unit 100 to acquire an object function such as a cutoff frequency for the one grouping candidate.

The grouping determination unit 410 performs operation similar to the operation of acquiring a cutoff frequency for one grouping candidate to further acquire an object function such as a cutoff frequency for a next grouping candidate acquired by the machine learning unit 420. The grouping determination unit 410 repeats this operation to acquire a combination of filters with which the value of the object function such as the cutoff frequency becomes the best, from the plurality of grouping candidates that the machine learning unit 420 has acquired.

(3) Search Based on Determined Rule

The grouping unit 404 sets, based on a determined rule, k filters having undergone initial adjustments into m (k>m) filters. Examples of the rule include that filters each having less dumping (each having a smaller dumping ratio) are not combined to each other (=gentle filters are combined to each other), or filters each having a higher frequency are combined to each other in a prioritized manner, and filters having attenuation center frequencies that differ from each other are not combined to each other. The method for acquiring a composite filter in which a plurality of filters are combined into one is performed through operation that is similar to the operation of acquiring grouping candidates, which is described above in (1) Full search for combinations of filters. When acquiring a plurality of grouping candidates based on this rule, the grouping unit 404 acquires a combination of filters with which the value of the object function such as the cutoff frequency becomes the best, from the acquired grouping candidates.

(4) Combining Filters One by One

The grouping unit 404 combines k filters having undergone initial adjustments one by one to set m (k>m) filters. For example, by combining filters in such a manner as to subtract one filter from the k filters to set (k−1) filters, to subtract one filter from the (k−1) filters to set (k−2) filters, etc., until the k filters are equal in number to the m filters, it is not necessary to evaluate a pattern of $_{(k-1)}C_{(m-1)}$.

The method for acquiring a composite filter in which a plurality of filters are combined into one is performed as described below. The grouping unit 404 adjusts the coefficients $\omega_c$, $\tau$, and $\delta$ of one composite filter to allow frequency characteristics in input-output gain, which have been acquired by causing the servo control unit 100 in which the (k−1) filters including the one composite filter in which filters adjacent to each other are combined to each other are set as the filter 130 to operate, to lie below the curve of the ideal frequency characteristics in input-output gain of the normative model described with reference to FIGS. 5 and 6, similarly to the operation of the filter setting unit 402, and to make the cutoff frequency highest. Next, the grouping unit 404 adjusts, when one composite filter in which filters adjacent to each other in the (k−1) filters are combined to each other is newly provided to set (k−2) filters, the coefficients of the newly provided composite filter to allow frequency characteristics in input-output gain, which have been acquired by causing the servo control unit 100 in which the (k−2) filters have been set as the filter 130 to operate, to lie below the curve of the ideal frequency characteristics in input-output gain of the normative model described with reference to FIGS. 5 and 6, similarly to the operation of the filter setting unit 402, and to make the cutoff frequency highest. These operations as described above are repeated to acquire a combination of m filters.

<Machine Learning Unit>

The configuration and operation of the machine learning unit 420 when the grouping unit 404 acquires grouping candidates for the filter 130 through (2) Search using machine learning described above will now be described below. In the below description, a case when the machine learning unit 420 performs reinforcement learning will be described. However, machine learning is not particularly limited to the reinforcement learning. For example, the machine learning unit 420 may perform supervised learning.

The machine learning unit 420 sets, to allow the filter setting unit 402 to set k filters having undergone initial adjustments into m (k>m) filters, a combination of filters provided with one or more composite filters each of which a plurality of filters adjacent to each other in the k filters are combined into one. The machine learning unit 420 sets, in one combination where one or more composite filters is or are provided to set the k filters having undergone the initial adjustments into m filters, a combination of filters including one composite filter, as the filter 130, in the servo control unit 100. The machine learning unit 420 acquires, as a state S, frequency characteristics in input-output gain and phase lag, which are acquired from the frequency characteristics measurement unit 300 by causing the servo control unit 100 to operate. Then, the machine learning unit 420 performs Q-learning in which an adjustment of the value of each of the coefficients $\omega_c$, $\tau$, and $\delta$ of one composite filter serving as the filter 130 in the servo control unit 100 pertaining to the state S is regarded as an action A. When there are other composite filters than the one composite filter described above in one combination of filters, Q-learning is further performed in a similar manner for the coefficients of the other composite filters. As known to those skilled in the art, an object of Q-learning is to select an action A having the highest value Q(S, A) as an optimal action from among actions A that are possible to take under a certain state S.

Specifically, an agent (the machine learning device) selects various actions A under a certain state S, and further selects a better action based on rewards given for an action A selected at that time to perform learning of a correct value Q(S, A).

Furthermore, another object is to finally satisfy Q(S, A)=E[Σ(γ')r₁] to maximize the total of rewards to be acquired in the future. Where, E[ ] represents an expected value, t represents time, $\gamma$ represents a parameter called a discount rate, described later, $r_t$ represents a reward at the time t, and $\Sigma$ represents the sum at the time t. In this equation, the expected value is an expected value when the state is changed in accordance with an optimal action. It is possible to represent such an updating equation for the value Q(S, A) by, for example, Mathematical equation 3 (indicated below as Equation 3) described below.

$$Q(S_{t+1}, A_{t+1}) \leftarrow Q(S_t, A_t) + \qquad\qquad \text{[Equation 3]}$$
$$\alpha(r_{t+1} + \gamma \max_A Q(S_{t+1}, A) - Q(S_t, A_t))$$

In Mathematical equation 3 described above, $S_t$ represents a state of an environment at the time t, and $A_t$ represents an action at the time t. With the action $A_t$, the state changes to $S_{t+1}$. Note that $r_{t+1}$ represents a reward acquired by the change in the state. Furthermore, the item attached with max represents one acquired by multiplying the value Q by γ when an action A having the highest value Q known at that moment is selected under the state $S_{t+1}$. Note herein that γ represents a parameter satisfying 0<γ≤1 and is called a discount rate. Furthermore, α represents a learning coefficient falling within a range of 0<α≤1.

Mathematical equation 3 described above represents a method for updating a value $Q(S_t, A_t)$ of an action $A_t$ under a state $S_t$ based on a reward $r_{t+1}$ returned as a result of a trial $A_t$.

The machine learning unit 420 observes state information S containing frequency characteristics in input-output gain and phase lag per frequency, which are outputted from the frequency characteristics measurement unit 300, and determines an action A. The machine learning unit 420 receives a reward each time the action A is performed. The reward will be described later. In Q-learning, the machine learning unit 420 searches in a trial-and-error manner for an optimal action A according to which the total of rewards to be acquired in the future is maximized, for example. By doing so, the machine learning unit 420 is able to select the optimal action A (that is, optimal one of the coefficients $ω_c$, τ, and δ of one composite filter) with respect to the state S.

FIG. 9 is a block diagram illustrating the machine learning unit 420 according to an embodiment of the present invention. To perform the reinforcement learning described above, the machine learning unit 420 includes, as illustrated in FIG. 9, a state information acquisition unit 421, a learning unit 422, an action information output unit 423, a value function storage unit 424, and a grouping candidates output unit 425.

The state information acquisition unit 421 is configured to acquire, from the filter setting unit 402, via the grouping determination unit 410, the coefficients $ω_c$, τ, and δ of k filters having undergone initial adjustments. Furthermore, the state information acquisition unit 421 sets, to set the k filters having undergone the initial adjustments into m (k>m) filters, a combination of filters provided with one or more composite filters each of which a plurality of filters adjacent to each other in the k filters are combined into one. A user generates beforehand initial values for the coefficients $ω_c$, τ, and δ of a composite filter at the point in time when starting Q-learning for the first time. The coefficients of the filters other than the coefficients of the composite filter have values having undergone initial adjustments. In the present embodiment, the initial setting value of each of the coefficients $ω_c$, τ, and δ of the composite filter, which the user has created, is adjusted to optimal one through reinforcement learning.

The state information acquisition unit 421 outputs, at the point in time when starting Q-learning for the first time, information that designates a plurality of filters adjacent to each other, which should be excluded, among the k filters having undergone the initial adjustments, and the initial values of the coefficients of the composite filter, which are to be replaced with other ones, to the action information generation unit 4223.

Furthermore, the state information acquisition unit 421 acquires, from the frequency characteristics measurement unit 300, and outputs, to the learning unit 422, via the grouping determination unit 410, the state S including an input-output gain (amplitude ratio) and a phase lag, which are acquired by causing the servo control unit 100 to drive using a speed command (sinusoidal wave), based on each of the coefficients $ω_c$, τ, and δ of the filter 130 that has been set in the combination of filters including one composite filter. The state information S corresponds to an environmental state S for Q-learning.

The learning unit 422 is a part configured to perform learning of the value Q(S, A) when a certain action A is selected under a certain environmental state S. The learning unit 422 includes a reward output unit 4221, a value function updating unit 4222, and an action information generation unit 4223.

The reward output unit 4221 is a part configured to calculate a reward when an action A is selected under a certain state S. The servo control unit 100 having the filter 130 in which the coefficients of a composite filter correspond to the initial values first operates. The reward output unit 4221 provides, when the frequency characteristics in input-output gain, among the frequency characteristics in input-output gain and phase lag, which have been outputted from the frequency characteristics measurement unit 300, lie above the curve of the ideal frequency characteristics in input-output gain of the normative model described with reference to FIGS. 5 and 6, similarly to the operation of the filter setting unit 402, a negative reward to correct each of the coefficients of the composite filter from its initial value. On the other hand, when the value of the input-output gain is equal to or less than the value of the input-output gain of the normative model, the reward output unit 4221 uses the frequency characteristics in phase lag, which have been outputted from the frequency characteristics measurement unit 300, to acquire a first cutoff frequency serving as the value of a first object function. The cutoff frequency is, for example, a frequency at which gain characteristics on a bode diagram, which are acquired by measuring a frequency response calculated from an input-output gain of the servo control unit 100, correspond to −3 dB, or a frequency at which phase characteristics correspond to −180 degrees. As the cutoff frequency increases, the feedback gain increases and the response speed increases.

Next, the servo control unit 100 having the filter 130 in which the initial values of the coefficients of the composite filter have been adjusted operates. The reward output unit 4221 provides, when the frequency characteristics in input-output gain, among the frequency characteristics in input-output gain and phase lag, which have been outputted from the frequency characteristics measurement unit 300, lie above the curve of the ideal frequency characteristics in input-output gain of the normative model described with reference to FIGS. 5 and 6, similarly to the operation of the filter setting unit 402, a negative reward to further correct each of the coefficients of the composite filter. On the other hand, when the value of the input-output gain is equal to or less than the value of the input-output gain of the normative model, the reward output unit 4221 uses the frequency characteristics in phase lag, which have been outputted from the frequency characteristics measurement unit 300, to acquire a second cutoff frequency serving as the value of a second object function.

Then, the reward output unit 4221 acquires a difference between the first cutoff frequency and the second cutoff frequency, which serves as an evaluation function. Then, the reward output unit 4221 provides a positive reward when the second cutoff frequency has increased to be greater than the first cutoff frequency, a zero reward when the second cutoff frequency and the first cutoff frequency have been equal to each other, and a negative reward when the second cutoff frequency has decreased to be smaller than the first cutoff frequency.

Next, the reward output unit 4221 uses, when, in operation similar to the operation of acquiring the second cutoff frequency, the servo control unit 100 having the filter 130 in which the coefficients of the composite filter have been further adjusted operates, and the value of the input-output gain is equal to or less than the value of the input-output gain of the normative model, the frequency characteristics in phase lag, which have been outputted from the frequency characteristics measurement unit 300, to acquire a third cutoff frequency serving as the value of a third object function. Then, the reward output unit 4221 acquires a difference between the second cutoff frequency and the third cutoff frequency, which serves as an evaluation function. Then, the reward output unit 4221 provides a positive reward when the third cutoff frequency has increased to be greater than the second cutoff frequency, a zero reward when the third cutoff frequency and the second cutoff frequency have been equal to each other, and a negative reward when the third cutoff frequency has decreased to be smaller than the second cutoff frequency.

Furthermore, the reward output unit 4221 repeatedly performs, when the value of the input-output gain is equal to or less than the input-output gain of the normative model, as described above, operation similar to the operation of providing a reward using the second cutoff frequency and the third cutoff frequency, while adjusting the coefficients of the composite filter. The reward output unit 4221 has been described above.

The value function updating unit 4222 is configured to perform Q-learning based on a state S, an action A, a state S' where the action A is taken under the state S, and a reward acquired in the manner described above to update a value function Q that the value function storage unit 424 stores. For updating the value function Q, online learning, batch learning, or mini-batch learning may be performed. Online learning is a learning method for immediately updating the value function Q each time a certain action A is taken under the current state S and the state S is transitioned to a new state S'. Furthermore, batch learning is a learning method for taking a certain action A under the current state S and allowing the state S to repeatedly transition to a new state S' to collect learning data and use all the collected learning data to update the value function Q. Furthermore, mini-batch learning serves as intermediate learning between online learning and batch learning, and is a learning method for updating the value function Q each time learning data is collected at a certain amount.

The action information generation unit 4223 is configured to select an action A in the process of Q-learning for the current state S. In the process of Q-learning, the action information generation unit 4223 generates action information A and outputs the generated action information A to the action information output unit 423 to perform the operation (which corresponds to the action A in Q-learning) of adjusting each of the coefficients $\omega_c$ and $\tau$ of the composite filter in the filter 130.

Furthermore, the action information generation unit 4223 may be caused to take a measure for selecting an action A' with a known method such as a greedy method that selects an action A' having the highest value Q(S, A) among the values of currently estimated actions A or an s greedy method that randomly selects an action A' at a small provability $\varepsilon$ and selects an action A' having the highest value Q(S, A) in other cases.

The action information output unit 423 is a part configured to transmit the action information A that has been outputted from the learning unit 422 to the servo control unit

100. As described above, by adjusting the current state S, that is, each of the coefficients $\omega_c$, $\tau$, and $\delta$ of the composite filter in the filter 130, which have been set currently, based on the action information, the current state S transits to a next state S'.

The value function storage unit 424 is a storage device configured to store the value function Q. The value function Q may be stored as a table (hereinafter referred to as an action value table) per state S or action A, for example. The value function Q stored in the value function storage unit 424 is updated by the value function updating unit 4222. Furthermore, the value function Q stored in the value function storage unit 424 may be shared with another machine learning unit 420. By allowing the value function Q to be shared among a plurality of the machine learning units 420, it is possible to perform reinforcement learning in a distributed manner among the machine learning units 420, improving the efficiency of the reinforcement learning.

The above description relates to the reinforcement learning when the filter 130 is provided with one composite filter. However, when the filter 130 includes other composite filters in addition to the one composite filter, the reinforcement learning is further performed in a similar manner for the coefficients of the other composite filters. Then, when there are other combinations where one or more composite filters is or are provided to set k filters having undergone initial adjustments into m filters, the reinforcement learning is further performed in a similar manner.

The grouping candidates output unit 425 is configured to acquire each of the coefficients $\omega_c$, $\tau$, and $\delta$ of each filter in a combination of filters including one or more composite filters, with which the value Q(S, A) becomes maximum, based on the value function Q updated as the value function updating unit 4222 performs Q-learning, and to output each of the coefficients of the combination of filters as a grouping candidate to the grouping determination unit 410. More specifically, the grouping candidates output unit 425 acquires the value function Q that the value function storage unit 424 stores. This value function Q is one that has been updated as the value function updating unit 4222 performs Q-learning, as described above. Then, the grouping candidates output unit 425 acquires each of the coefficients $\omega_c$, $\tau$, and $\delta$ of each filter in the combination of filters including one or more composite filters, with which the value Q(S, A) becomes maximum, based on the value function Q, and outputs each of the coefficients of the combination of filters as a grouping candidate to the grouping determination unit 410. Reinforcement learning is further performed for other combinations where one or more composite filters is or are provided and k filters having undergone initial adjustments are set into m filters to acquire each of the coefficients $\omega_c$, $\tau$, and $\delta$ of each filter in the other combinations of filters including the one or more composite filters, with which the value Q(S, A) becomes maximum. The grouping candidates output unit 425 outputs each of the coefficients of the combination of filters as a next grouping candidate to the grouping determination unit 410. For example, when the group G1 illustrated in FIG. 7 is regarded as one combination of filters, the group G2 represents an example of another combination of filters.

As described above, the machine learning unit 420 performs learning of an optimal value of each of the coefficients $\omega_c$, $\tau$, and $\delta$ of a composite filter for acquiring a grouping candidate.

The function blocks included in the control system 10 have been described above. To implement those function blocks, the control system 10, the servo control unit 100, or the control assistance unit 400 includes an operation processing device such as a central processing unit (CPU). Furthermore, the control system 10, the servo control unit 100, or the control assistance unit 400 includes an auxiliary storage device such as a hard disk drive (HDD) in which various control programs such as application software or an operating system (OS) are stored, and a main storage device such as a random access memory (RAN) for temporarily storing data required for the operation processing device to execute a program.

Then, in the control system 10, the servo control unit 100, or the control assistance unit 400, the operation processing device reads out the application software or the OS from the auxiliary storage device, and deploys the read-out application software or the read-out OS on the main storage device to perform operation processing based on the application software or the OS. Furthermore, the operation processing device controls various types of hardware disposed in respective devices based on an operation result. In this way, the function blocks of the present embodiment are implemented. That is, it is possible to implement the present embodiment when hardware and software cooperate with each other.

In a case where the control assistance unit 400 is expected to perform a large amount of operations, for example, a graphics processing unit (GPU) may be mounted on a personal computer, and a technique called general-purpose computing on graphics processing unit (GPGPU) may be used to utilize the GPU in operation processing to achieve prompt processing. Furthermore, to perform more prompt processing, a plurality of computers each mounted with such a GPU as described above may be used to build a computer cluster to allow the plurality of computers included in this computer cluster to perform parallel processing.

Next, operation of the control assistance unit 400 will now be described with reference to a flowchart. FIG. 10 is a flowchart illustrating the operation of the control assistance unit.

At Step S11, the resonance detection unit 401 acquires, in a case where the servo control unit 100 operates in a state where the filter 130 is not provided, from the frequency characteristics measurement unit 300, frequency characteristics in input-output gain (amplitude ratio) of the servo control unit 100. At Step S12, the resonance detection unit 401 detects k resonance points in the frequency characteristics in input-output gain (gain characteristics).

At Step S13, the filter setting unit 402 cooperates with the frequency characteristics estimation unit 403 to set k filters corresponding to the k resonance points to perform, per filter, initial adjustments for the coefficients of the k filters. Although the number of $n_{ini}$ filters that undergo initial adjustments is identical to the number of the resonance points (k=$n_{ini}$), initial adjustments may be performed for $n_{ini}$ filters, which are smaller in number than the k resonance points (k>$n_{ini}$). At Step S14, the grouping unit 404 performs grouping for the k filters having undergone the initial adjustments to set m (k>m) filters.

At Step S15, the control assistance unit 400 determines whether the processing of performing grouping for the k filters to set m (k>m) filters should be continued, returns to Step S14 when it is determined that the processing should be continued, and ends the operation of the control assistance unit when it is determined that the processing should not be continued.

According to the embodiment described above, it is possible to determine allocation of filters in such a manner as to satisfy a restriction for the number of filters while realizing suppression of resonance.

Second Embodiment

In the first embodiment, the frequency characteristics measurement unit 300 has calculated, when measuring frequency characteristics in input-output gain (amplitude ratio) and phase lag of the servo control unit 100, the frequency characteristics from a speed command that is a sinusoidal signal having a varying frequency and speed feedback. In the present embodiment, the frequency generation unit 200 inputs a sinusoidal signal to a previous stage of the current control unit 140 while sequentially changing its frequency. Then, the frequency characteristics measurement unit 300 calculates, when measuring frequency characteristics in input-output gain and phase lag of the servo control unit 100, the frequency characteristics from the sinusoidal signal that has been inputted to the previous stage of the current control unit 140, and from an output of the speed control unit 120.

Figure 11:
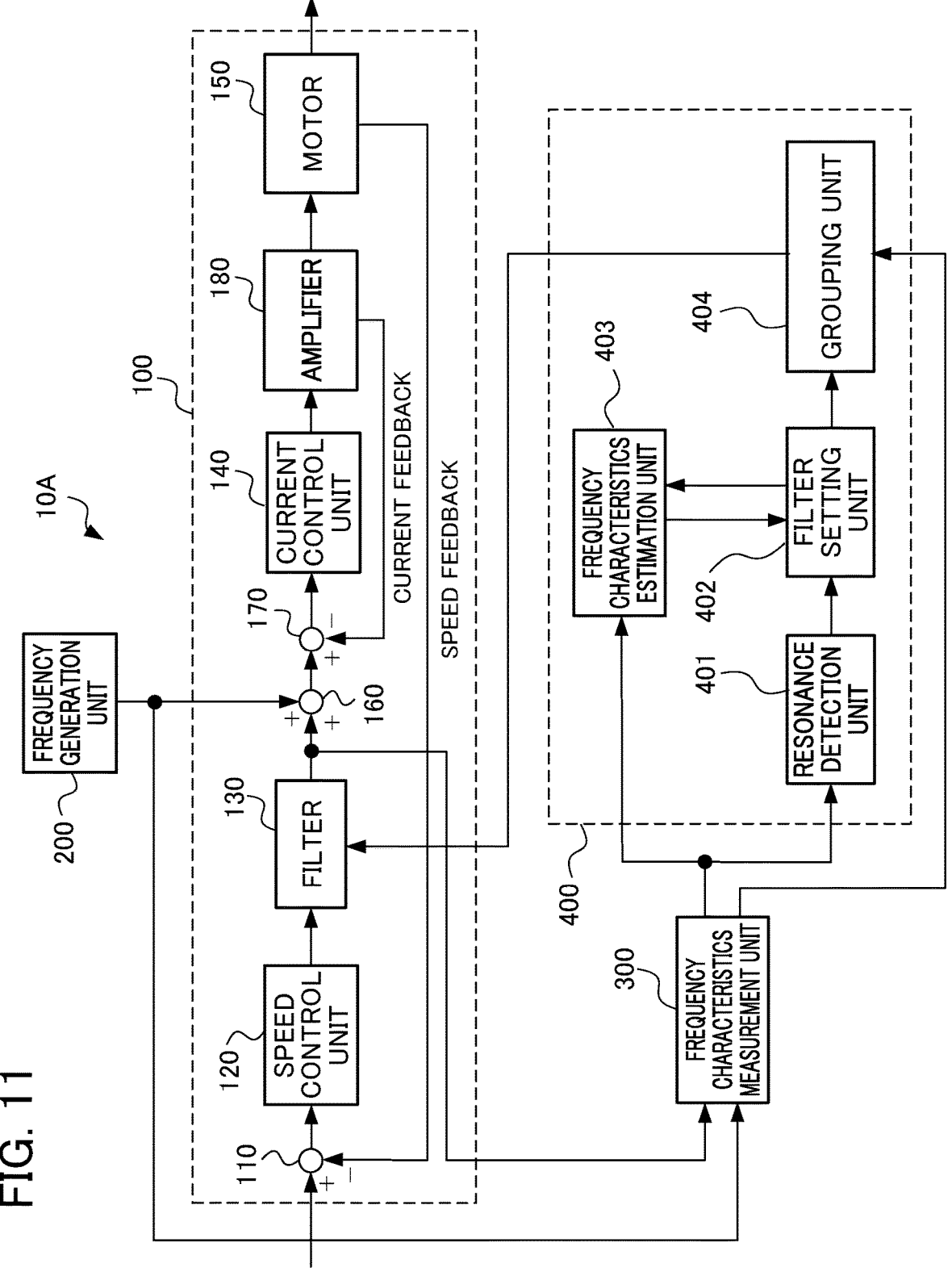
FIG. 11 is a block diagram illustrating a control system according to a second embodiment of the present disclosure.

FIG. 11 is a block diagram illustrating a control system according to a second embodiment of the present disclosure. In FIG. 11, like reference numerals designate identical components to the components of the control system 10 illustrated in FIG. 1, and duplicated descriptions thereof are thus omitted. As illustrated in FIG. 11, a control system 10A includes an adder 160 provided at a previous stage of the subtractor 170, and this adder 160 accepts an input of a sinusoidal signal having a varying frequency, which is outputted from the frequency generation unit 200. The adder 160 is connected to the subtractor 170, and the current control unit 140 is connected to an amplifier 180. The amplifier 180 includes a current detector, and a current detected by the current detector is inputted to the subtractor 170. The subtractor 170, the current control unit 140, and the amplifier 180 configure a current feedback loop, and the current feedback loop is included in the speed feedback loop. The sinusoidal signal corresponds to a first signal having a varying frequency, and the output of the filter 130 corresponds to a second signal that is inputted to the current feedback loop in the speed feedback loop.

The inductance of the motor 150 is subject to magnetic saturation, for example, and changes in a non-linear manner due to the current flowing into the motor 150. When there is a change from a servo parameter that has not yet undergone an adjustment to a servo parameter that has undergone an adjustment, a torque command to be inputted to the current control unit 140 changes and, when the current gain of the current control unit 140 is constant, the current flowing into the motor 150 also changes. When the current flowing into the motor 150 changes, and the inductance changes in a non-linear manner, the characteristics of the current feedback loop also change in a non-linear manner.

In the present embodiment, an input signal to be inputted to the subtractor 110 is at a zero level, the frequency generation unit 200 inputs a sinusoidal signal to the previous stage of the current control unit 140 while sequentially changing its frequency, and the frequency characteristics measurement unit 300 measures frequency characteristics in input-output gain and phase lag of the servo control unit 100 from the sinusoidal signal and the output of the speed control unit 120. In this manner, the input to the current feedback loop becomes constant. Therefore, it is possible to acquire a plurality of resonances by the control assistance unit 400 while keeping the linearity of the characteristics of the current feedback loop.

The first and second embodiments have been described above. However, in the first and second embodiments, the filter setting unit 402 may include a machine learning unit that is similar in configuration to the machine learning unit 420 illustrated in FIG. 9, and may use the machine learning unit to perform, per filter, initial adjustments for the coefficients of k filters. Since the operation of performing initial adjustments for each filter is similar to the operation of performing adjustments for each filter to optimal one of the coefficients $\omega_c$, $\tau$, and $\delta$ of a composite filter, and its description is thus omitted.

In the embodiments described above, the object function is not limited to the cutoff frequency, and there may be other object functions such as $|1-(\text{gain characteristics of closed loop})|^2$ and $|1-(\text{closed-loop transfer function})|^2$. It is possible to calculate the closed-loop transfer function using $G(j\omega)=A(\omega)\times e^{-j\theta(\omega)}$ from the gain $A(\omega)$ and the phase lag $\theta(\omega)$ on the bode diagram. The closed loop referred herein denotes the speed feedback loop that the subtractor 110, the speed control unit 120, the filter 130, the current control unit 140, and the motor 150 configure.

Modification Examples

As for modification examples of the control systems, there are following configurations other than the configuration illustrated in FIG. 11.
<Modification Examples in which Control Assistance Units are Connected to Servo Control Units Via Network>

FIG. 12 is a block diagram illustrating a modification example of the control systems. It is possible to apply a control system 10B illustrated in FIG. 12 to the control systems 10 and 10A according to the first and second embodiments illustrated in FIGS. 1 and 11. The control system 10B differs from the control systems 10 and 10A in that n (n represents a natural number of 2 or more) servo control units 100-1 to 100-$n$ are connected to n control assistance units 400-1 to 400-$n$ via a network 500 and each of the servo control unit includes the frequency generation unit 200 and the frequency characteristics measurement unit 300. The control assistance units 400-1 to 400-$n$ each have a configuration identical to that of the control assistance unit 400 illustrated in FIG. 1. Each of the servo control units 100-1 to 100-$n$ corresponds to the servo control device, and each of the control assistance units 400-1 to 400-$n$ corresponds to the control assistance device. Note that it is obvious that either or both of the frequency generation unit 200 and the frequency characteristics measurement unit 300 may be provided outside each of the servo control units 100-1 to 100-$n$.

Note herein that the servo control unit 100-1 and the control assistance unit 400-1 form a one-to-one pair, and are communicably connected to each other. The servo control units 100-2 to 100-$n$ and the control assistance units 400-2 to 400-$n$ are also respectively connected to each other, similar to the servo control unit 100-1 and the control assistance unit 400-1. In FIG. 12, n pairs of the servo control units 100-1 to 100-$n$ and the control assistance units 400-1 to 400-$n$ are connected to each other via the network 500. The servo control unit and the control assistance unit in each of the n pairs of the servo control units 100-1 to 100-$n$ and the control assistance units 400-1 to 400-$n$ may also be directly connected to each other via a connection interface. As for the n pairs of the servo control units 100-1 to 100-$n$ and the control assistance units 400-1 to 400-$n$, for example, some of the pairs may be installed in a single factory, or the n pairs may be respectively installed in different factories.

The network 500 is, for example, a local area network (LAN) constructed in a factory, the Internet, a public telephone network, or a combination thereof. There is no limit specifically set for the network 500 in regards to a specific communication style, whether it is of a wired connection or a wireless connection, and the like.
<Degree of Freedom in System Configuration>

In the embodiments described above, each of the servo control units 100-1 to 100-$n$ and each of the control assistance units 400-1 to 400-$n$ form a one-to-one pair and are communicably connected to each other. However, for example, a single control assistance unit may also be connected to a plurality of servo control units via the network 500 to make it possible to communicate with each other to perform control assistance for each of the servo control units. At that time, each of the functions of a single control assistance unit may be appropriately distributed among a plurality of servers as a distributed processing system. Furthermore, each of the functions of a single control assistance unit may be implemented by using a virtual server function or the like that is available on a cloud basis.

Furthermore, when there are the n control assistance units 400-1 to 400-$n$ respectively corresponding to the servo control units 100-1 to 100-$n$, which are respectively identical to each other in model name, specifications, or series, respective estimation results in the control assistance units 400-1 to 400-$n$ may be shared. By doing so, it is possible to configure a more optimal model.

The first and second embodiments and the modification examples have been described above. It is possible to implement each component included in the control systems according to the embodiments and the modification examples in the form of hardware, software, or a combination thereof. Furthermore, it is possible to implement the servo control method to be performed through cooperation with each other of the components included in the above control systems in the form of hardware, software, or a combination thereof. In here, being implemented in the form of software means being implemented when a computer reads and executes a program.

It is possible to use a non-transitory computer readable medium that varies in type to store the program, and to supply the program to a computer. Examples of the non-transitory computer readable medium include tangible storage media that vary in type. Examples of the non-transitory computer readable medium include magnetic recording media (for example, hard disk drives), magneto-optical recording media (for example, magneto-optical discs), compact discs read only memory (CD-ROMs), compact discs-recordable (CD-Rs), compact discs-rewritable (CD-R/Ws), and semiconductor memories (for example, mask ROMs, programmable ROMs (PROMs), erasable PROMs (EPROMs), flash ROMs, and random access memories (RAMs)).

Each of the above-described embodiments represents a preferred embodiment of the present invention. However, the scope of the present invention is not limited to the embodiments described above, and it is possible to embody the present invention in various modifications without departing from the spirit of the present invention.

It is possible that the control assistance device, the control system, and the filter adjustment method according to the present disclosure take various types of embodiments having configurations described below, including the embodiments described above.

(1) A control assistance device (for example, the control assistance unit 400) configured to assist in setting a plurality of first filters (for example, the filters 130-1 to 130-$m$) provided in a servo control device (for example, the servo control unit 100) configured to control a motor (for example, the motor 150), the control assistance device including: a resonance detection unit (for example, the resonance detection unit 401) configured to detect a plurality of resonance points in frequency characteristics in input-output gain of the servo control device, the frequency characteristics being measured based on an input signal and an output signal each having a varying frequency; a filter setting unit (for example, the filter setting unit 402) configured to set, to suppress the plurality of resonance points, a plurality of second filters that are greater in number than the plurality of first filters; and a grouping unit (for example, the grouping unit 404) configured to separately group the plurality of second filters to set the plurality of first filters.

With this control assistance device, it is possible to determine allocation of filters in such a manner as to satisfy a restriction for the number of filters while realizing suppression of resonance.

(2) The control assistance device according to (1) described above, in which the grouping unit includes a machine learning unit (for example, the machine learning unit 420) configured to acquire a grouping candidate provided with at least one composite filter combined with two or more filters in the plurality of second filters and a grouping determination unit (for example, the grouping determination unit 410) configured to acquire a combination of the plurality of first filters from a plurality of the grouping candidates calculated by the machine learning unit.

(3) The control assistance device according to (1) described above, in which the grouping unit provides, based on a predetermined rule, at least one composite filter combined with two or more filters in the plurality of second filters to acquire a combination of the plurality of first filters.

(4) The control assistance device according to (1) described above, in which the grouping unit combines each of the plurality of second filters one by one to acquire a combination of the plurality of first filters.

(5) The control assistance device according to (1) described above, in which the grouping unit provides at least one composite filter combined with two or more filters in the plurality of second filters and searches for all patterns for setting the plurality of first filters to acquire a combination of the plurality of first filters from all the patterns.

(6) The control assistance device according to any one of (1) to (5) described above, in which each filter in the plurality of first filters includes a notch filter or/and a low-pass filter.

(7) The control assistance device according to any one of (1) to (6) described above, in which, even when the plurality of second filters are equal to or less in number than a restriction number, the grouping unit separately groups the plurality of second filters to set the plurality of first filters.

(8) A control system including: a servo control device (for example, the servo control unit 100) configured to control a motor (for example, the motor 150); and the control assistance device according to any one of (1) to (7) described above (for example, the control assistance unit 400), the control assistance device detecting a plurality of resonance points in frequency characteristics in input-output gain and input-output phase lag of the servo control device, the control assistance device setting, to suppress the plurality of resonance points, a plurality of second filters that are greater in number than a plurality of first filters to be set in the servo control device, the control assistance device separately grouping the plurality of second filters to set the plurality of first filters.

With this control system, it is possible to determine allocation of filters in such a manner as to satisfy a restriction for the number of filters while realizing suppression of resonance.

(9) The control system according to (8) described above, including: a frequency generation device configured to generate a signal having a varying frequency, and to input the signal to the servo control device; and a frequency characteristics measurement device configured to measure, based on the signal and an output signal of the servo control device, frequency characteristics in input-output gain and phase lag of the servo control device.

(10) The control system according to (8) or (9) described above, in which the servo control device includes a current feedback loop used to control a current flowing into the motor and a feedback loop including the current feedback loop and having the filters, and further including: a frequency generation device configured to generate a first signal having a varying frequency, and to input the first signal to the current feedback loop; and a frequency characteristics measurement unit configured to measure, based on the first signal and a second signal to be inputted to the current feedback loop in the feedback loop, frequency characteristics in input-output gain and phase lag of the servo control device.

(11) A filter adjustment assistance method for a control assistance device (for example, the control assistance unit 400) configured to assist in setting a plurality of first filters provided in a servo control device (for example, the servo control unit 100) configured to control a motor (for example, the motor 150), the filter adjustment method including: detecting a plurality of resonance points in frequency characteristics in input-output gain of the servo control device, the frequency characteristics being measured based on an input signal and an output signal each having a varying frequency; setting, to suppress the plurality of resonance points, a plurality of second filters that are greater in number than the plurality of first filters; and separately grouping the plurality of second filters to set the plurality of first filters.

With this filter adjustment method, it is possible to determine allocation of filters in such a manner as to satisfy a restriction for the number of filters while realizing suppression of resonance.

EXPLANATION OF REFERENCE NUMERALS

10, 10A, 10B Control system
100, 100-1 to 100-$n$ Servo control unit
110 Subtractor
120 Speed control unit
130, 130-1 to 130-$m$ Filter
140 Current control unit
150 Motor
200 Frequency generation unit
300 Frequency characteristics measurement unit
400, 400-1 to 400-$n$ Control assistance unit

25

401 Resonance detection unit
402 Filter setting unit
403 Frequency characteristics estimation unit
404 Grouping unit
410 Grouping determination unit
420 Machine learning unit
421 State information acquisition unit
422 Learning unit
423 Action information output unit
424 Value function storage unit
425 Grouping candidates output unit
500 Network

The invention claimed is:

1. A control assistance device configured to assist in setting a plurality of first filters provided in a servo control device configured to control a motor, the control assistance device comprising:

a resonance detection unit configured to detect a plurality of resonance points in frequency characteristics in input-output gain of the servo control device, the frequency characteristics being measured based on an input signal and an output signal each having a varying frequency;

a filter setting unit configured to set, to suppress the plurality of resonance points, a plurality of second filters that are greater in number than the plurality of first filters; and a grouping unit configured to separately group the plurality of second filters to set the plurality of first filters, wherein the grouping unit sets the plurality of first filters, by combining two or more filters in the plurality of second filters to provide at least one composite filter, and the number of the plurality of first filters is equal to or less than a restriction number of filters provided in the servo control device, and the servo control device controls the motor based on the setting of the plurality of first filters.

2. The control assistance device according to claim 1, wherein the grouping unit includes a machine learning unit configured to acquire a grouping candidate provided with the at least one composite filter, and a grouping determination unit configured to acquire a combination of the plurality of first filters from a plurality of the grouping candidates calculated by the machine learning unit.

3. The control assistance device according to claim 1, wherein the grouping unit provides, based on a predetermined rule, the at least one composite filter to acquire a combination of the plurality of first filters.

4. The control assistance device according to claim 1, wherein the grouping unit combines each of the plurality of second filters one by one to acquire a combination of the plurality of first filters.

5. The control assistance device according to claim 1, wherein the grouping unit provides the at least one composite filter and searches for all patterns for setting the plurality of first filters to acquire a combination of the plurality of first filters from all the patterns.

6. The control assistance device according to claim 1, wherein each filter in the plurality of first filters includes a notch filter or/and a low-pass filter.

7. The control assistance device according to claim 1, wherein, even when the plurality of second filters are equal to or less in number than the restriction number, the grouping unit separately groups the plurality of second filters to set the plurality of first filters.

8. A control system comprising:

a servo control device configured to control a motor; and the control assistance device according to claim 1, the control assistance device detecting a plurality of resonance points in frequency characteristics in input-output gain and input-output phase lag of the servo control device, the control assistance device setting, to suppress the plurality of resonance points, a plurality of second filters that are greater in number than a plurality of first filters to be set in the servo control device, the control assistance device separately grouping the plurality of second filters to set the plurality of first filters.

9. The control system according to claim 8, further comprising:

a frequency generation device configured to generate a signal having a varying frequency, and to input the signal to the servo control device; and a frequency characteristics measurement device configured to measure, based on the signal and an output signal of the servo control device, frequency characteristics in input-output gain and phase lag of the servo control device.

10. The control system according to claim 8, wherein the servo control device includes a current feedback loop used to control a current flowing into the motor and a feedback loop including the current feedback loop and having the filters, further comprising:

a frequency generation device configured to generate a first signal having a varying frequency, and to input the first signal to the current feedback loop; and a frequency characteristics measurement unit configured to measure, based on the first signal and a second signal to be inputted to the current feedback loop in the feedback loop, frequency characteristics in input-output gain and phase lag of the servo control device.

11. A filter adjustment method for a control assistance device configured to assist in setting a plurality of first filters provided in a servo control device configured to control a motor, the method comprising:

detecting a plurality of resonance points in frequency characteristics in input-output gain of the servo control device, the frequency characteristics being measured based on an input signal and an output signal each having a varying frequency;

setting, to suppress the plurality of resonance points, a plurality of second filters that are greater in number than the plurality of first filters; and separately grouping the plurality of second filters to set the plurality of first filters, wherein the plurality of first filters is configured by combining two or more filters in the plurality of second filters to provide at least one composite filter, and the number of the plurality of first filters is equal to or less than a restriction number of filters provided in the servo control device, and the servo control device controls the motor based on the setting of the plurality of first filters.

* * * * *